(12) United States Patent
Hamano et al.

(10) Patent No.: US 10,631,137 B2
(45) Date of Patent: Apr. 21, 2020

(54) CLIENT, SERVER, AND INFORMATION SHARING SYSTEM

(71) Applicant: HONDA MOTOR CO., LTD., Tokyo (JP)

(72) Inventors: Yusuke Hamano, Tokyo (JP);
Masahiro Washizu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 466 days.

(21) Appl. No.: 15/050,727

(22) Filed: Feb. 23, 2016

(65) Prior Publication Data

US 2016/0255173 A1    Sep. 1, 2016

(30) Foreign Application Priority Data

Feb. 27, 2015  (JP) ................................. 2015-038678

(51) Int. Cl.
*G06F 15/16* (2006.01)
*H04W 4/08* (2009.01)
(Continued)

(52) U.S. Cl.
CPC ............. *H04W 4/08* (2013.01); *H04W 4/029* (2018.02); *H04W 4/21* (2018.02)

(58) Field of Classification Search
CPC ........ H04L 67/16; H04L 67/303; H04W 4/02; H04W 4/08; H04W 4/21; H04W 4/046
(Continued)

(56) References Cited

U.S. PATENT DOCUMENTS

2005/0113123 A1* 5/2005 Torvinen ............... H04W 4/021
455/519
2010/0268570 A1  10/2010 Rodriguez et al.
(Continued)

FOREIGN PATENT DOCUMENTS

JP    2000-010475 A    1/2000
JP    2002-351862 A    12/2002
(Continued)

OTHER PUBLICATIONS

Japanese Office Action application No. 2015-038680 dated Aug. 2, 2016.
(Continued)

*Primary Examiner* — Yves Dalencourt
(74) *Attorney, Agent, or Firm* — Squire Patton Boggs (US) LLP

(57) ABSTRACT

A system, etc. that can facilitate sharing of information when a predetermined condition is satisfied is provided. A client (2) includes: an input device (21) that detects an input mode of an own user; a communication device (23) that carries out communication; and a client control device (20) that determines whether or not a first condition set in advance is satisfied and, if the first condition is determined to be satisfied, causes the input device (21) to function as an input interface for sending predetermined first information, which is associated with a predetermined input mode, via the communication device (23) by the predetermined input mode having a smaller number of times of input or a smaller information quantity to be input with respect to the input device (21) than a case in which the first condition is determined to be not satisfied.

11 Claims, 16 Drawing Sheets

(51) Int. Cl.
*H04W 4/029* (2018.01)
*H04W 4/21* (2018.01)

(58) Field of Classification Search
USPC .......................................................... 709/203
See application file for complete search history.

(56) References Cited

U.S. PATENT DOCUMENTS

| | | | |
|---|---|---|---|
| 2011/0137995 A1 | 6/2011 | Stewart | |
| 2011/0246581 A1 | 10/2011 | Zhu et al. | |
| 2014/0113674 A1* | 4/2014 | Joseph | H04W 4/021 455/519 |
| 2014/0240440 A1 | 8/2014 | Seo et al. | |
| 2015/0163256 A1 | 6/2015 | Frank | |
| 2018/0337800 A1* | 11/2018 | Ichijo | |

FOREIGN PATENT DOCUMENTS

| | | |
|---|---|---|
| JP | 2002-354121 A | 12/2002 |
| JP | 2002-357445 A | 12/2002 |
| JP | 2004-163179 A | 6/2004 |
| JP | 2004177999 A | 6/2004 |
| JP | 2005-127994 A | 5/2005 |
| JP | 2005-181258 A | 7/2005 |
| JP | 2006-162503 A | 6/2006 |
| JP | 2006-276380 A | 10/2006 |
| JP | 2006-332830 A | 12/2006 |
| JP | 2008-224520 A | 9/2008 |
| JP | 2010-028322 A | 2/2010 |
| JP | 2013-115589 A | 6/2013 |
| JP | 2013-124925 A | 6/2013 |
| JP | 2013-181956 A | 9/2013 |
| JP | 2013-200697 A | 10/2013 |
| JP | 2013-210979 A | 10/2013 |
| JP | 2014-137706 A | 7/2014 |
| JP | 2014-170524 A | 9/2014 |
| JP | 2014-236493 A | 12/2014 |
| WO | 2011/013796 A1 | 2/2011 |
| WO | 2011/142238 A1 | 11/2011 |

OTHER PUBLICATIONS

Japanese Office Action application No. JP2015-038680 dated Feb. 21, 2017.
Japanese Office Action International Application No. 2015-038680 dated Sep. 12, 2017.
Japanese Office Action application No. 2015-038678 dated Oct. 11, 2016.
Japanese Office Action application No. 2015-038681dated Oct. 18, 2016.
Japanese Office Action application No. 2015-038679 dated Oct. 25, 2016.
U.S. Office Action issued in corresponding U.S. Appl. No. 15/040,070 dated Jun. 15, 2018.
Feb. 13, 2019 Office Action issued in U.S. Appl. No. 15/040,070.
U.S. Office Action dated Dec. 11, 2019 corresponding to related U.S. Appl. No. 15/040,070.

* cited by examiner

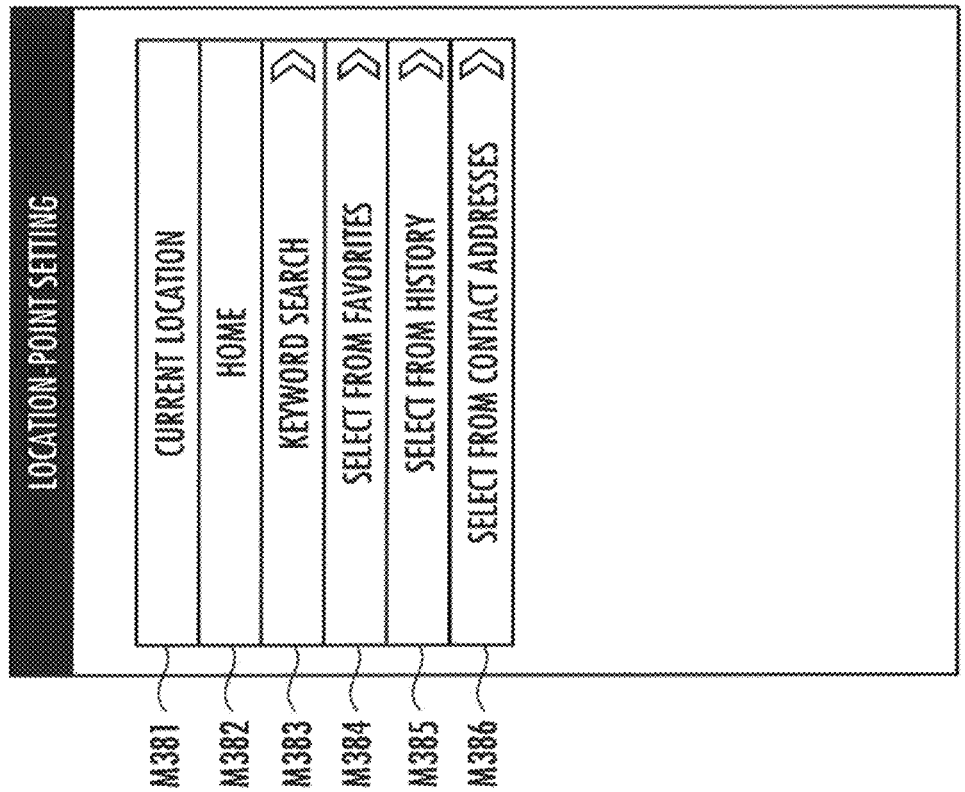
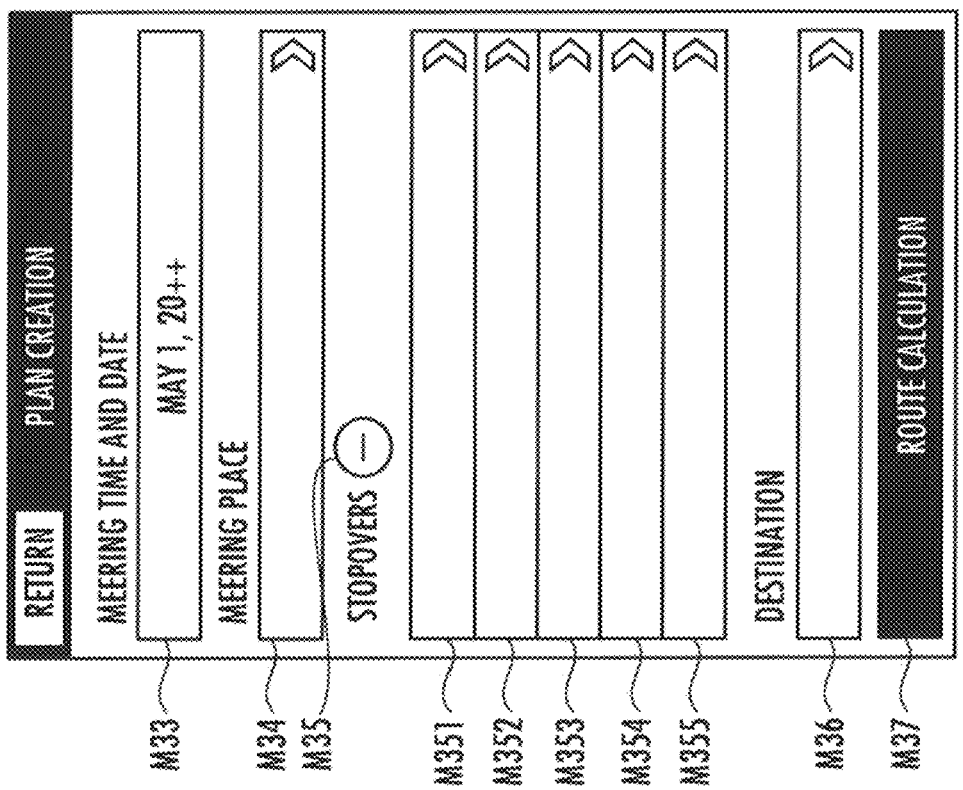

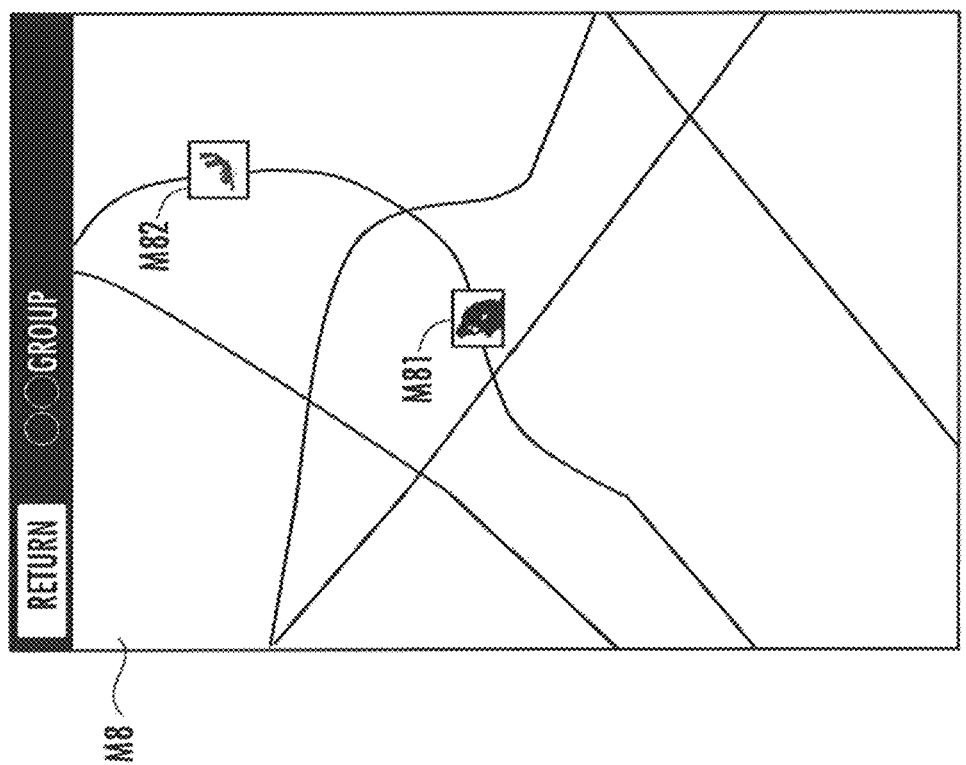
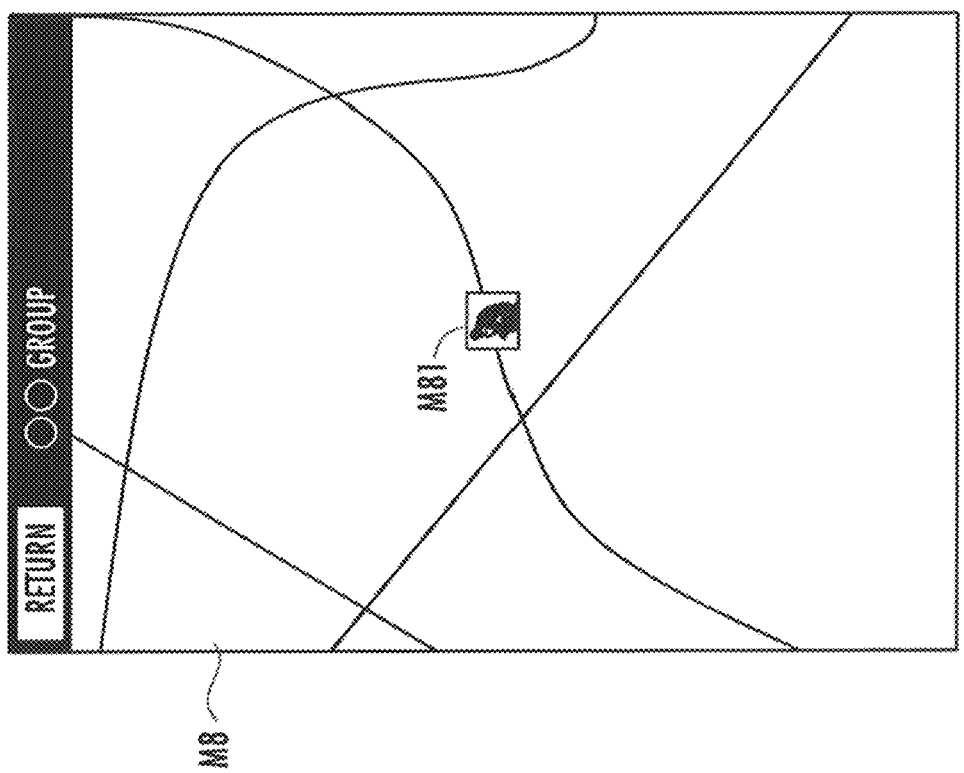

CLIENT, SERVER, AND INFORMATION SHARING SYSTEM

BACKGROUND OF THE INVENTION

Field of the Invention

The present invention relates to techniques for sharing information among a plurality of users.

Description of the Related Art

In order for a plurality of members constituting a group having the same transportation purpose to perceive the situations of each other, there is proposed a technical method that a taken image representing the state of a vehicle moving direction obtained through a mobile information terminal of a first one of the members and information related to identification information of a mobile information terminal of the other member is displayed by a mobile information terminal of the first member (see Japanese Patent Application Laid-Open No. 2013-210979).

If a predetermined condition is satisfied, for example, if a plurality of members are acting along the same action purpose, it is preferred that information be shared.

Therefore, the present invention is to solve the problem by providing a system, etc. that can facilitate sharing of information when a predetermined condition is satisfied.

SUMMARY OF THE INVENTION

A client of the present invention comprises an input device that detects an input mode of an own user; a communication device that carries out communication; and a client control device that determines whether or not a first condition set in advance is satisfied and, if the first condition is determined to be satisfied, causes the input device to function as an input interface for sending predetermined first information, which is associated with a predetermined input mode, via the communication device by the predetermined input mode having a smaller number of times of input or a smaller information quantity to be input with respect to the input device than a case in which the first condition is determined to be not satisfied.

According to the client of this configuration, if the first condition is determined to be satisfied, the own user can send the first information more easily than the case in which the first condition is determined to be not satisfied. Therefore, sharing of information in the case in which the predetermined condition is satisfied is facilitated.

It is preferred that the client of the present invention have a clock function that recognizes current time; wherein the first condition is a condition that the current time shown by the clock function is included in a time zone set in advance.

According to the client of this configuration, the first information can be easily sent in the time zone in which information sharing is expected to be carried out. Therefore, information sharing is facilitated.

In the client of the present invention, it is preferred that an output device that outputs information is comprised; wherein if the client control device recognizes, by communicating with external equipment via the communication device, new information sent from another client and if the first condition is determined to be satisfied, the client control device causes the output device to output, together with the new information, second information for causing the own user to recognize that the first information associated with the input mode can be sent by the predetermined input mode.

According to the client of this configuration, together with the new information sent from the second client, the second information for causing the own user to recognize that the first information associated with the input mode can be sent by the predetermined input mode is output. In other words, the additional information (second information) other than the information to be shared (new information) is output together with the information to be shared (new information). As a result, compared with the case in which they are separately output, the troublesomeness given to the own user can be reduced or eliminated.

In the client of this configuration, it is preferred that the output device include an image display device that displays an image; and the client control device cause the image display device to display an image including a button including the first information as an image including the second information.

According to the client of this configuration, since the button including the first information is output (displayed) together with the new information, the own user can recognize, together with the new information, that the first information can be sent by selecting the button. As a result, the troublesomeness given to the own user can be reduced more or eliminated.

In the client of the present invention, it is preferred that a storage device that stores information is comprised; wherein the client control device be configured so as to store, in the storage device, a condition set by the own user or another user as the first condition.

According to the client of this configuration, since the condition set by the own user or the another user is used as the first condition, upon determination of satisfaction or non-satisfaction of the first condition, the intention of the own user or the another user is taken into consideration. As a result, information sharing is facilitated.

A server of the present invention is a server having a communication function with each of a plurality of clients serving as mobile stations, the server preferred to comprise: a database that associates and stores a group action ID of a group action and a user ID of each of members serving as users registered to participate in the group action, and associates and stores a condition for the members to start the group action as a first condition and the user ID; and a server control device that determines whether or not the first condition is satisfied for each of the members based on the first condition stored in the database, and, if the first condition is determined to be satisfied for one of the members, transmits, to the client used by the member, an order for causing an input device to function as an input interface for sending predetermined first information associated with a predetermined input mode by the predetermined input mode having a smaller number of times of input or a smaller information quantity to be input with respect to the input device, which is provided at the client used by the member, than a case in which the server control device determines that the first condition is not satisfied for the member.

According to the server of this configuration, the first information can be easily sent by the member registered to participate in the group action. Therefore, information sharing upon the group action can be facilitated.

In the server of this configuration, it is preferred that the server control device be configured so as to store, as the first condition in the database, a condition for starting the group action received from the client of the member having the user ID associated with the group action ID.

According to the server of this configuration, the condition for starting the group action received from the client of the user participating in the group action is stored as the first condition. As a result, upon determination of the first condition, the intention of the member to the group action is taken into consideration. Therefore, information sharing of the member in the group action is facilitated.

In the server of this configuration, it is preferred that the server control device be configured so as to transmit information for causing the user to designate the condition for starting the group action to the client when receiving registration of participation in the group action by the user of the client.

According to the server of this configuration, upon registration of participation in the group action, the condition for starting the group action can be designated by the user. Therefore, compared with the case in which these are individually carried out, the troublesomeness given to the user is reduced or eliminated.

An information sharing system of the present invention is a system comprising the client of the present invention and a server that communicates with the client; wherein it is preferred that the server comprise a database that associate and store a group action ID of a group action and a user ID of each of members serving as users registered to participate in the group action, and associate and store a condition for the members to start the group action as the first condition and the user ID; wherein the client control device is configured to transmit a user ID of the own user to the server via the communication device, receive from the server a condition for the own user to start the group action regarding the group action having a group action ID associated with the user ID, and determine whether or not the condition for starting the group action is satisfied as determination of satisfaction or non-satisfaction of the first condition.

According to the information sharing system of this configuration, since the first information can be easily sent by the member registered to participate in the group action, information sharing upon the group action is facilitated.

In the information sharing system of this configuration, it is preferred that the client comprises an output device for outputting information; and, if the client control device recognizes, by communicating with the server via the communication device, that a second condition is satisfied in addition to the first condition, the second condition being that a user ID of another user serving as a user of another client be associated with the group action ID in a case in which new information sent from the another client is recognized, the client control device causes the output device to output, together with the new information, second information for causing the own user to recognize that the first information associated with the input mode can be sent by the predetermined input mode.

According to the information sharing system of this configuration, if the user ID of the another user is associated with the group action ID, the second information for causing the own user to recognize that the first information can be sent is output.

In other words, if the probability that the new information sent from the another user is related to the group action is high, the second information for easily sending the first information is output. Therefore, the troublesomeness given to the own user is reduced or eliminated.

In the information sharing system of the present invention, it is preferred that the server comprise a server control device configured so as to store, as the first condition in the database, a condition for starting the group action received from a client of a member having a user ID associated with the group action ID.

According to the information sharing system of this configuration, the condition for starting the group action received from the client of the user participating in the group action is stored as the first condition. As a result, upon determination of the first condition, the intention of the member to the group action is taken into consideration. Therefore, information sharing of the member in the group action is facilitated.

In the information sharing system of the present invention, it is preferred that the server control device be configured so as to transmit information for the user to designate the condition for starting the group action to the client when receiving registration of participation in the group action by the user of the client.

According to the information sharing system of this configuration, upon registration of participation in the group action, the condition for starting the group action can be designated by the user. Therefore, compared with the case in which they are individually carried out, the troublesomeness given to the user can be reduced or eliminated.

The information sharing system of the present invention is characterized by comprising the server of the present invention and the client serving as the mobile station.

According to the information sharing system of this configuration, working effects similar to those of the server of the present invention are exerted.

BRIEF DESCRIPTION OF THE DRAWINGS

FIG. 11 is an explanatory drawing about a developed mode of a plan creation screen;

FIG. 12 is an explanatory drawing about a locational-point setting screen;

FIG. 17 is an explanatory drawing about a first example of a position sharing screen;

FIG. 18 is an explanatory drawing about a second example of a position sharing screen;

DETAILED DESCRIPTION OF THE PREFERRED EMBODIMENTS (Configuration)

Figure 1:
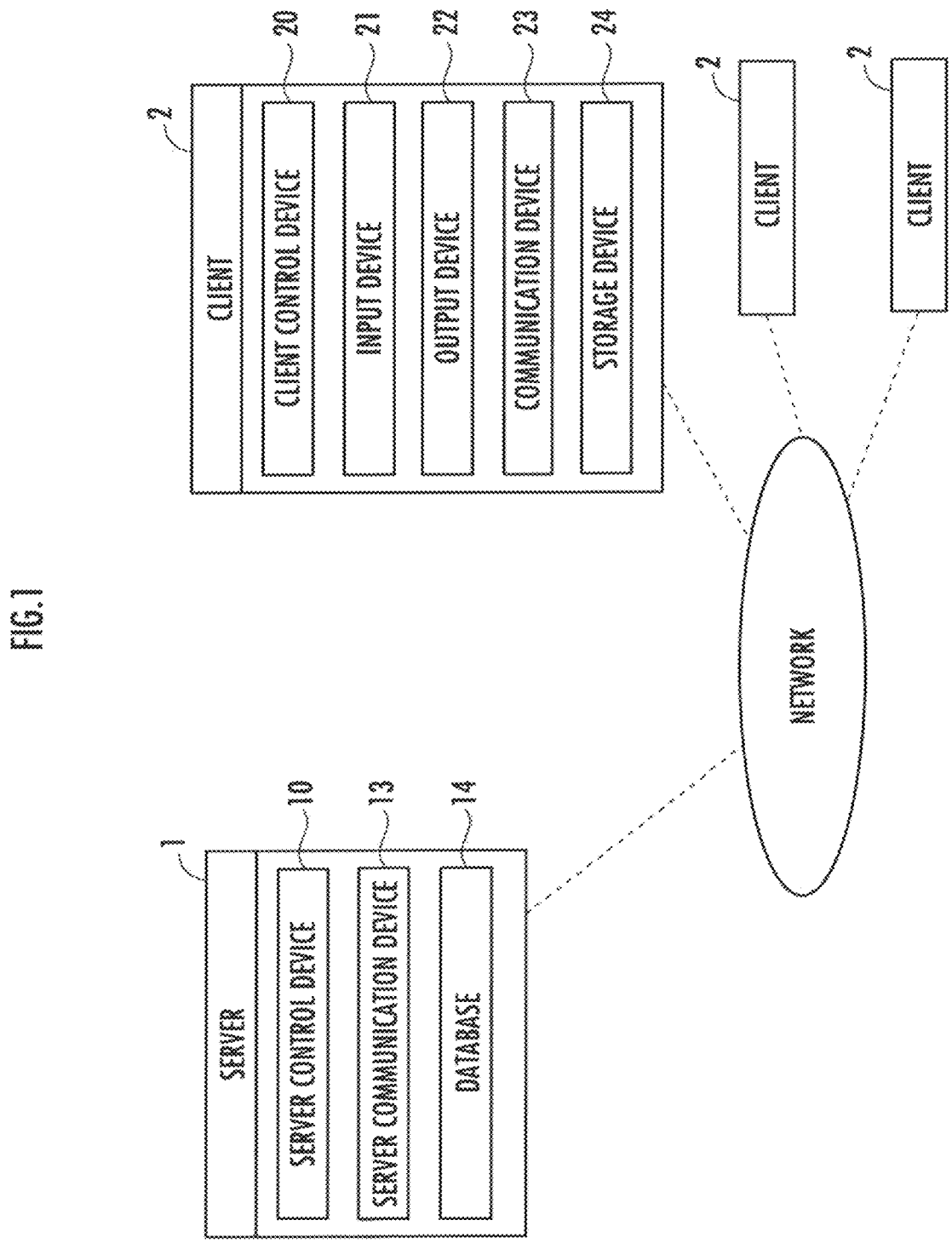
FIG. 1 is a configuration explanatory drawing of an information sharing system as an embodiment of the present invention.

An information sharing system shown in FIG. 1 consists of a server 1 and clients 2 serving as mobile stations, which can communicate with each other via a network.

The server 1 comprises a server control device 10, a server communication device 13, and a database 14 (server storage device). The server control device 10 consists of, for example, a memory (storage device) such as a ROM and a RAM and an I/O circuit. The server control device 10 is configured so as to execute later-described arithmetic processing.

The expression that a constituent element of the present invention is "configured" so as to execute assigned arithmetic processing means that an arithmetic processing device such as a CPU constituting the constituent element is "programmed" or "designed (planned)" so as to read software from a memory or a recording medium such as a ROM, a RAM, etc. in addition to necessary information and execute arithmetic processing with respect to the information in accordance with the software. Constituent elements may consist of a common processor (arithmetic processing device), or constituent elements may consist of a plurality of processors which can communicate with each other.

Part or all of a computer(s) constituting the server control device 10 may consist of a computer(s) constituting a client control device 20. For example, part or all of the server 1 may consist of the one or plurality of clients) 2 serving as a mobile station(s).

The client 2 consists of an information terminal such as a tablet-type terminal or a smartphone designed to have a size, a shape, and a weight so that it can be carried by a user. The client 2 may be an information terminal which is designed to have a size, etc. so that it can be mounted in a vehicle. The client 2 comprises the client control device 20, an input device 21, an output device 22, and a storage device 24. The client 2 further comprises a communication device 23 for mutually communicating with an external terminal(s) such as the server 1 in accordance with communication standards which are appropriate for long-distance wireless communication such as WiFi (registered tradename).

The input device 21 consists of a position input device such as a touch pad, the output device 22 consists of a display device such as a liquid crystal panel, and both of the devices are combined to constitute a touch panel. Thus, the touch panel functions as an input interface and an output interface. The touch panel displays a function image(s) corresponding to the functions of an application(s) (application software) installed in the client 2.

The input device 21 may alternatively or additionally consist of a detection device which detects the mode of input operations (speech contents or gestures) of the user by a non-contact method such as a sound input device (microphone) or an image taking device. The output device 22 may additionally consist of a sound output device (speaker). If the input device 21 is an image taking device or the like which can distinguish gestures (movements of face expressions or movements of body parts such as finger tips or arms) of the user by a non-contact method, the mode of the gestures can be detected by the client control device 20 as the mode of input operations.

The client control device 20 consists of a computer. The client control device 20 is configured so as to execute later-described arithmetic processing. The client 2 comprises a self-location measuring function by utilizing, for example, GPS.

The client control device 20 functions as a user interface manager (UIM), for example, the client control device 20 adjusts the display contents of the touch panel depending on the mode of the touch gesture of the user on the touch panel. Examples of the touch gestures include tapping (single tapping, double tapping, and long tapping), flicking (upward flicking, downward flicking leftward flicking, and rightward flicking), swiping pinching (pinching in and pinching out), or multi touches.

The expression that a first device "recognizes" information based on communication with a second device means execution of every arithmetic processing for acquiring the information accompanied by communication, for example: the first device receives the information from the second device; the first device derives the information by executing predetermined arithmetic processing (for example, calculation processing or search processing) by using the signals received from the second device as targets; the first device receives the information, which is the result of arithmetic processing by the second device, from the second device; and the first device reads the information from an internal storage device or an external storage device in accordance with the received signals.

(Functions)

(Group Registration)

A method of registering one or a plurality of groups serving as a belonging target(s) of each of the plurality of clients 2 or users thereof with respect to the database 14 of the server 1. In accordance with needs, the clients 2 are separated into a first client 2a and a second client 2b (see FIG. 2 and FIG. 3). The user of the first client 2a is referred to as "first user", and the user of the second client 2b is referred to as "second user". The clients 2 can function as the first client 2a and the second client 2b, respectively. Transverse arrows in FIG. 2 and FIG. 3 represent unidirectional or bidirectional communication of data or signals through the network of the server 1 and the clients 2.

When one application is operated (touch panel operation) from among a plurality of application icons displayed on the touch panel at the client 2, a corresponding application is activated. In accordance with this, a front page including a plurality of menu buttons is displayed on the touch panel. When a designation menu (for example, a touring menu) is operated from among the plurality of menus, the server control device 10 recognizes a user ID, which is for distinguishing the user of the client 2, based on communication with the client 2 and then determines whether or not a profile associated with the user ID is registered in the database 14t.

Figure 2:
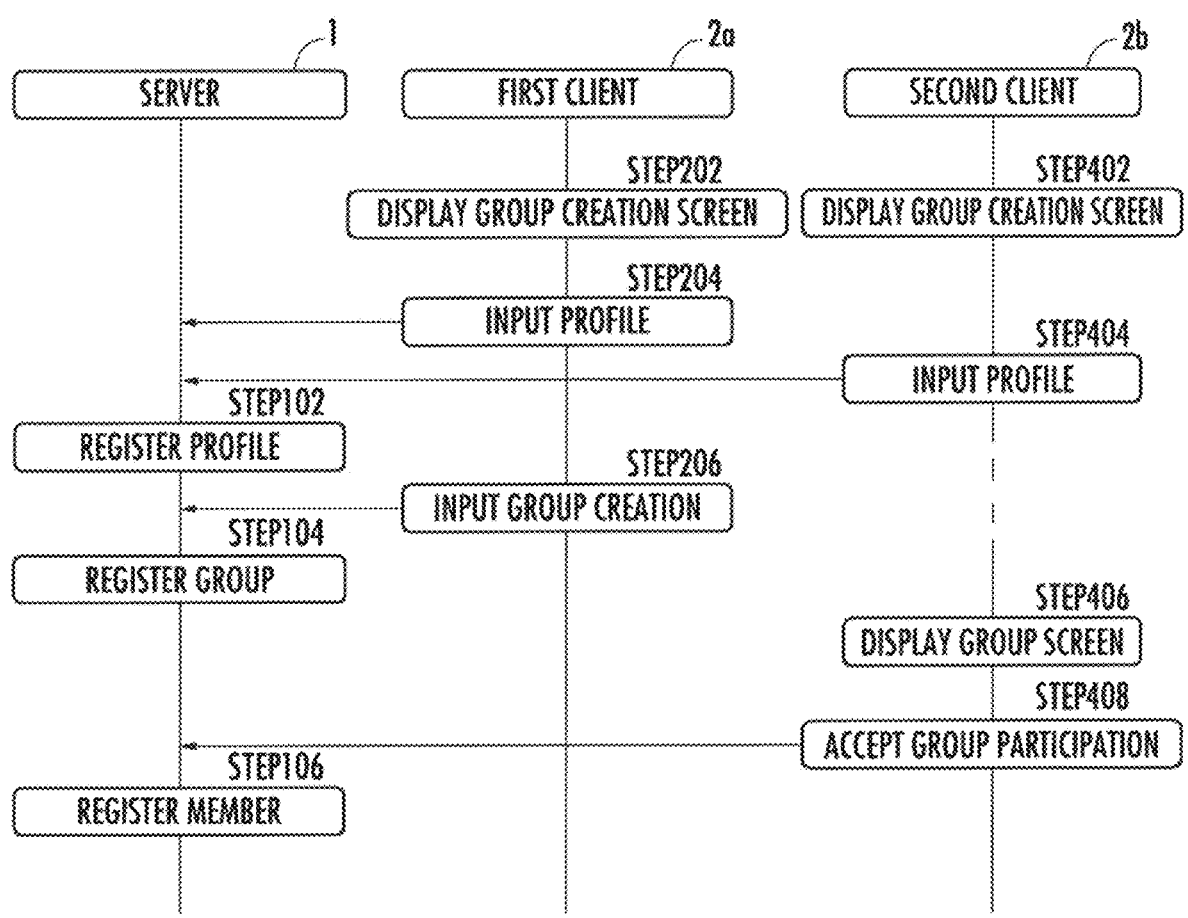
FIG. 2 is an explanatory drawing about a group registering function by the information sharing system.
Figure 3:
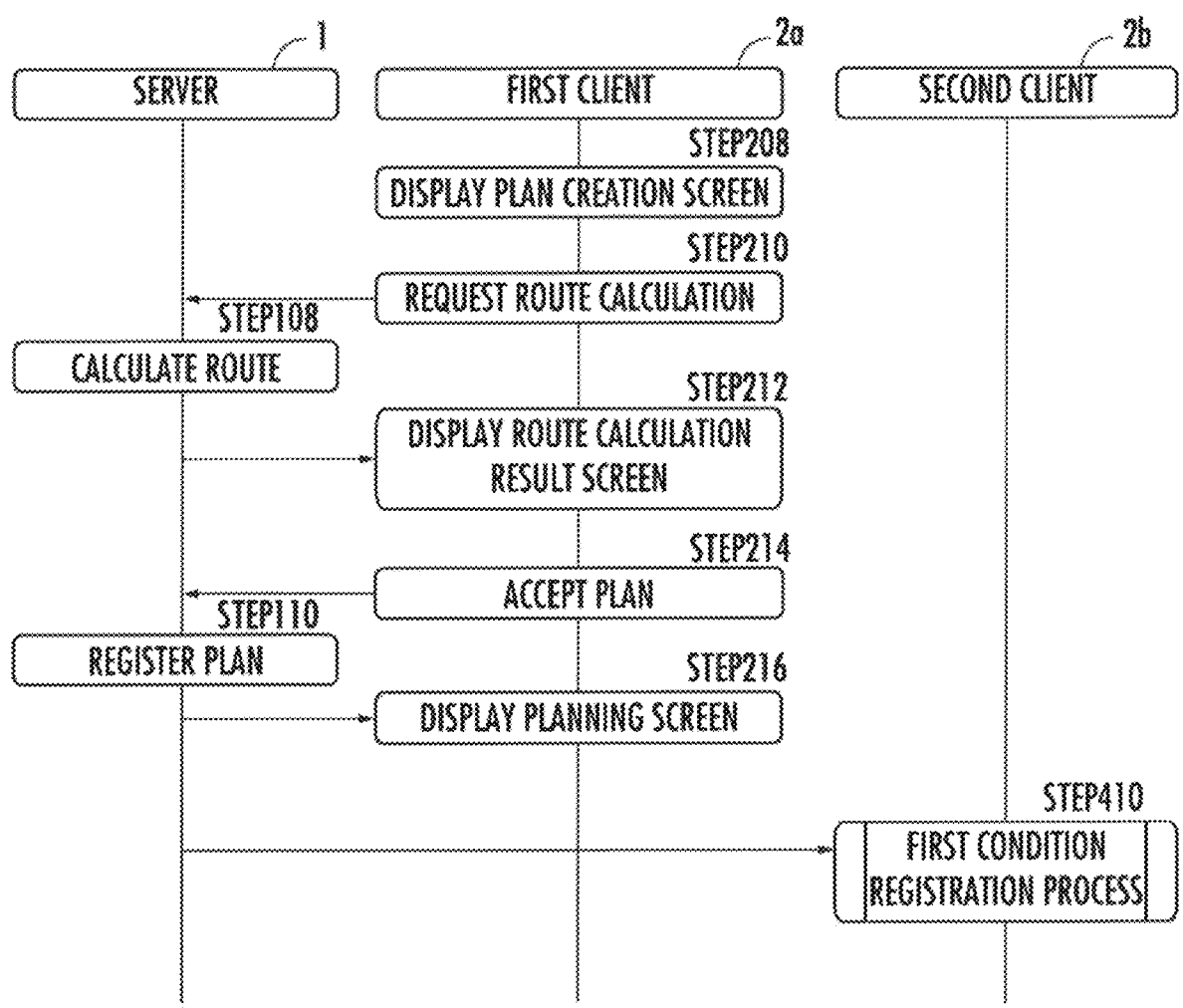
FIG. 3 is an explanatory drawing about a plan-information sharing function by the information sharing system.
Figure 5:
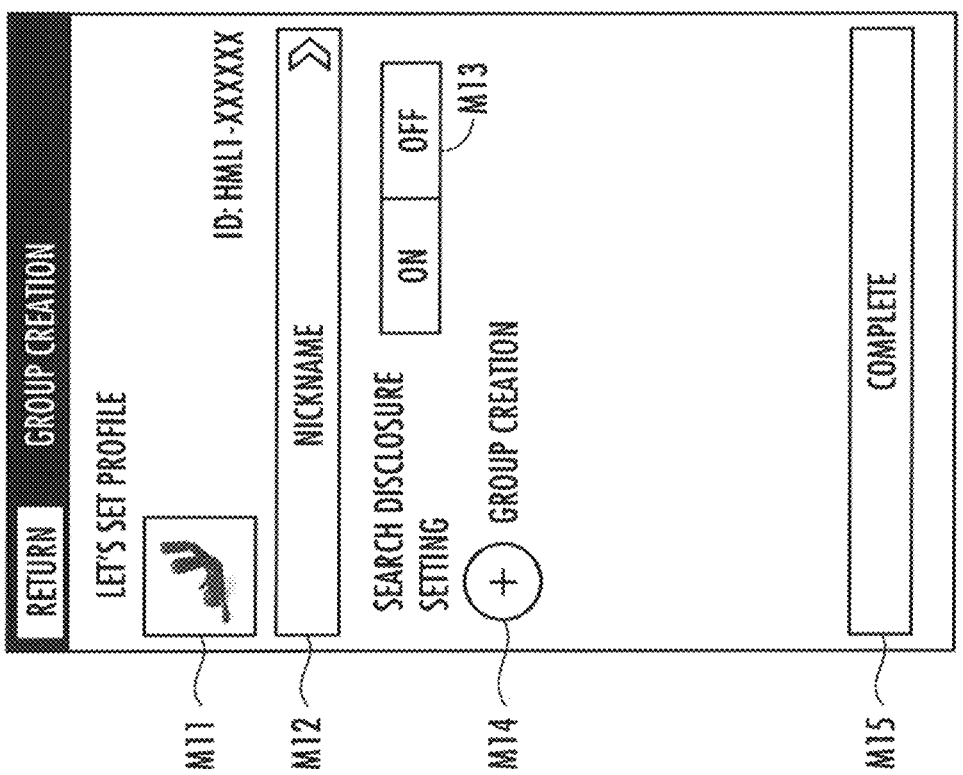
FIG. 5 is an explanatory drawing about a group creation screen.

If the profile of the user is unregistered when the designation menu is operated, a "group creation screen" is displayed on the touch panel of the client 2 (FIG. 2/STEP 202, STEP 402). For example as shown in FIG. 5, the group creation screen includes a registration button M11 of an icon image of the user, a nickname button M12, set buttons M13 of the searchability of the profile by others, a group creation button M14, and a completion button M15. By operations of the buttons, the profile of the user including the icon image and a nickname is set (FIG. 2/STEP 204, STEP 404). When a "RETURN" button, which is at the upper left of the screen, is operated, the display screen of the touch panel makes a transition to a previous display screen. Since this is similar also in other later-described screens, the explanation will be omitted hereinafter.

In response to an operation of the button M11, a plurality of images saved in the storage device 24 (image folder) of the computer constituting the client 2 are displayed on the touch panel, and, in response to a further selection, one image is selected from among the plurality of images. An image(s) taken by the image taking device mounted in the client 2 also serves as a selection option(s). If the button M12 is operated, a nickname is editably input through an operation(s) of character keys (illustration omitted) displayed on the touch panel. When either one of the ON/OFF buttons M13 is operated to be selected, the profile searchability by others is set. After this setting, when the completion button M15 is designated by a touch panel operation, the server control device 10 associates the profile and the user ID with each other and registers them in the database 14 based on communication with the client 2 (FIG. 2/STEP 102).

Figure 6:
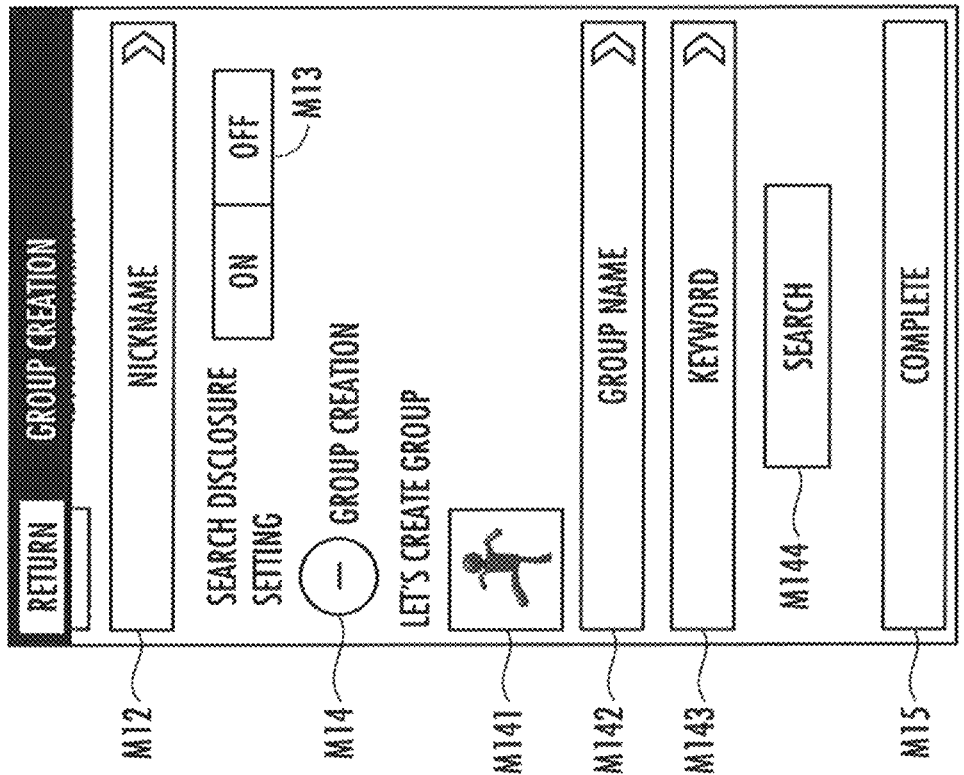
FIG. 6 is an explanatory drawing about a developed mode of the group creation screen.

In the first client 2a, if the group creation button M14 is designated, as shown in FIG. 6, a registration button M141 of an icon image of a group, a group name button M142, a keyword button M143, and a search button M144 are displayed on the touch panel. By operations of the buttons, the icon image, the name, and a user who is a participation candidate or an invitation target of the group are set. As a result, the group or a basis thereof specified by the icon image, the name, and the profile of the user serving as the participation candidate or the invitation target is created (FIG. 2/STEP 206).

For example, in response to an operation of the button M141, a plurality of images saved in the storage device 24 (image folder) of the first client 2a are displayed on the touch panel, and one image is selected from among the plurality of images in response to a further selection. When the button M142 is operated, a group name is editably input through an operation(s) of the character keys (illustration omitted) displayed on the touch panel. When the button M143 is operated, a keyword is editably input through an operation(s) of the character keys (illustration omitted) displayed on the touch panel. When the search button M144 is designated, based on communication with the first client 2a, the server control device 10 searches the database 14 for a profile(s) that has a nickname(s) including the input keyword and is set to "enable" the search by others. Based on communication with the first client 2a, the server control device 10 displays the result of the search on the touch panel (group creation screen). If the search result was not successful, re-search of users is executed in response to re-input of a keyword.

If the completion button M15 is designated, based on communication with the first client 2a, the server control device 10 mutually associates the user ID of the first user, the user ID of the profile-searched second user, and a group ID for distinguishing the group, which is created by the first user, and registers them in the database 14 (FIG. 2/STEP 104). The profiles of the users and the group may be collectively registered in the database 14 by designating the completion button M15 at the point when the profiles and the group are set.

At this point, the group is in a state in which only the first user who is the creator thereof is participating, and the second user is only invited to the group and has not participated therein. In other words, this is a state in which only a core or a basis of the group is formed. One user may create a plurality of groups and may participate in a plurality of groups. The fact that the first user is in a participated state is associated with the user ID of the first user and the group ID of the group and is registered in the database 14. The fact that the second user is in a non-participated state is associated with the user ID of the second user and the group ID of the group and is registered in the database 14.

Figure 7:
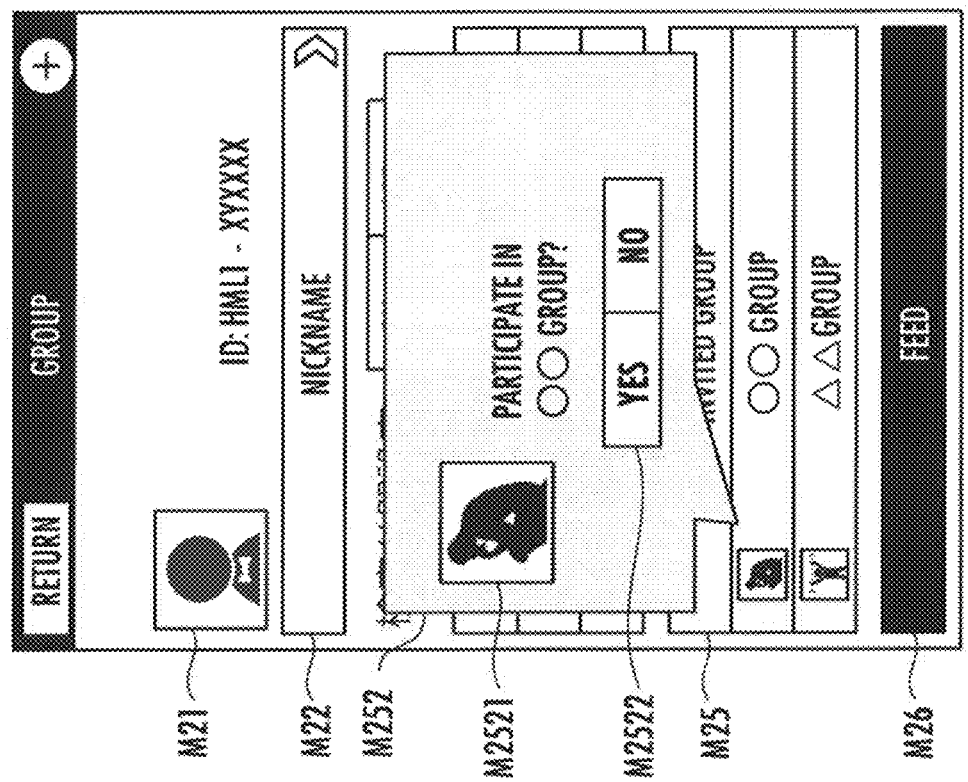
FIG. 7 is an explanatory drawing about a group screen.

At the second client 2b, at the point when the designation menu is designated, if the profile of the second user has been registered and the application is set to a first mode (for example, non-touring mode), a "group screen" is displayed on the touch panel (FIG. 2/STEP 406). For example as shown in FIG. 7, the group screen includes a registration button M21 of an icon image of the user, a nickname button M22, a set button M23 of the searchability of the profile by others, a list M24 of "participating groups", and a list M25 of "invited groups". Each of the lists shows icon images and names of the groups, which are registered in the database 14 in association with the user ID of the second user. As well as the group creation screen (see FIG. 5), the profile of the user including an icon image and a nickname is input or edited by touch panel operations according to the buttons, etc. (see FIG. 2/STEP 204, STEP 404).

Figure 8:
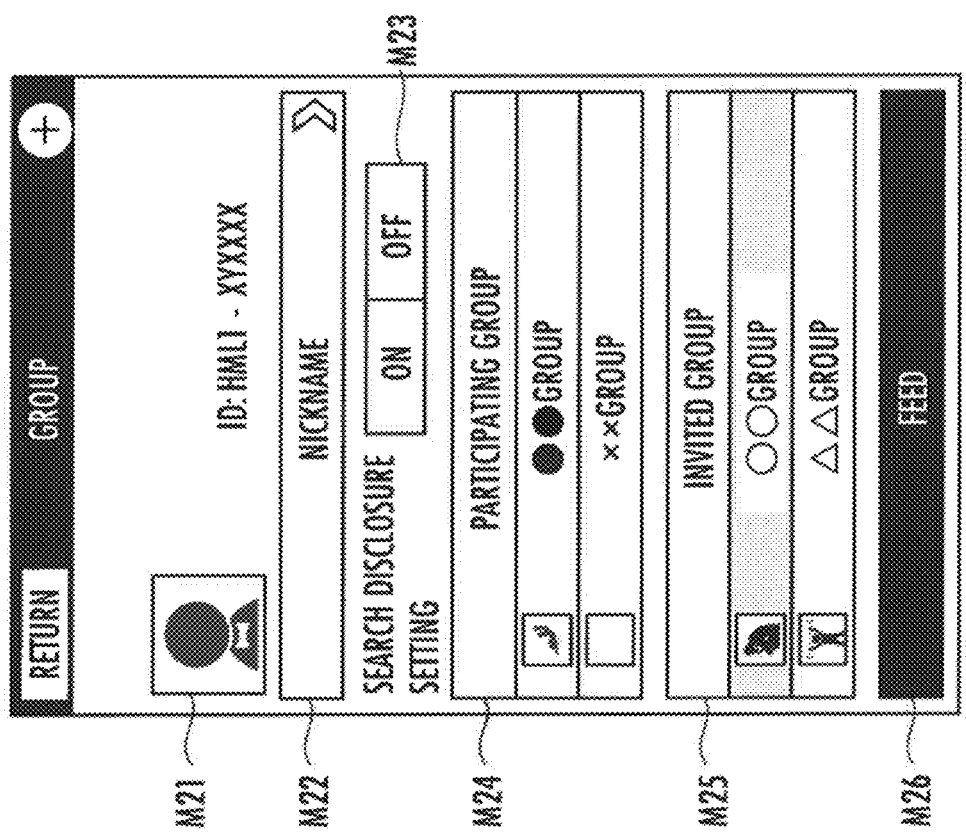
FIG. 8 is an explanatory drawing about a developed mode of a group creation screen.

At the second client 2b, in response to the fact that a single group has been selected from among the list M25 of the groups to which the second user is invited, as shown in FIG. 8, a window M252 of the single group is displayed on the touch panel. The window M252 includes an icon image M2521 and a group name of the group and a button M2522 (YES/NO) for selecting participation or non-participation to the group. If the YES button of the button M2522 is selected (FIG. 2/STEP 408), based on communication with the second client 2b, the server control device 10 mutually associates the fact that the second user is in a participated state with the user ID of the second user and the group ID of the group and registers them in the database 14 (FIG. 2/STEP 106). As a result, a belonging target of the second user is registered in the database 14.

Figure 15:
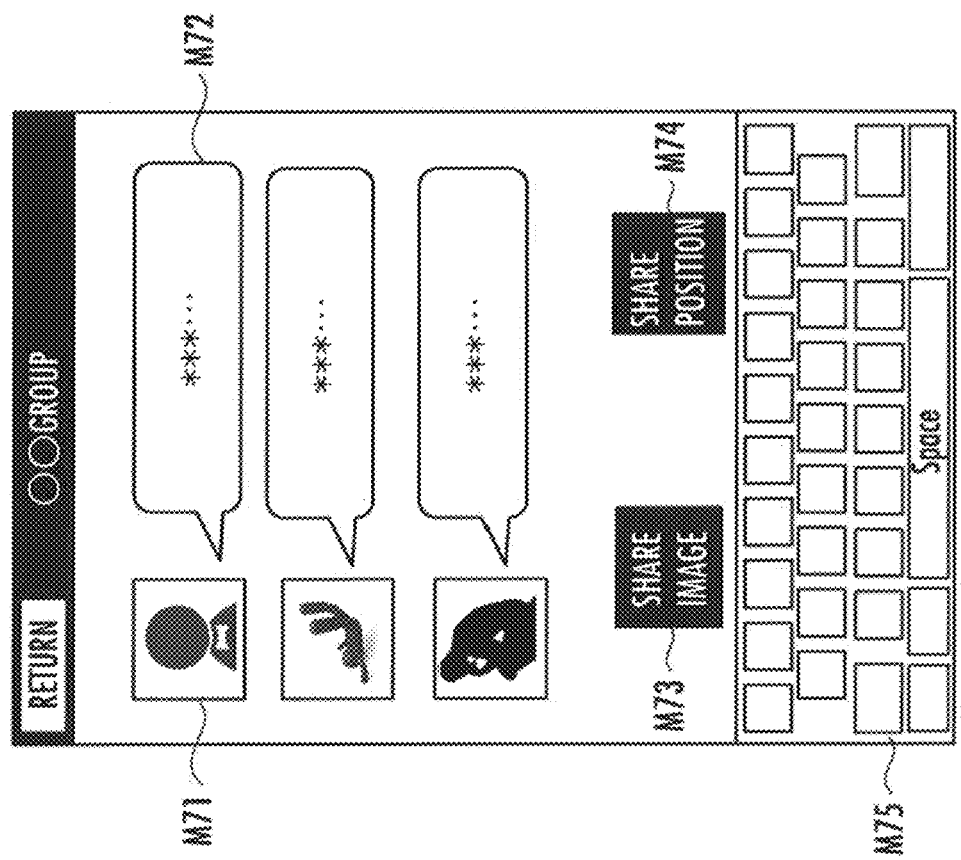
FIG. 15 is an explanatory drawing about a feed creation screen.

The group screen includes a feed button M26 (see FIG. 7 and FIG. 8), and, in response to designation of the button M26, the client control device 20 causes the display screen of the touch panel of the first client 2a to make a transition to a feed screen (FIG. 15).

At the second client 2b, based on communication with the server 1, the client control device 20 may display, on the touch panel, a message (push message) that the second user is invited to the group of the first user. As a result, for example, the second user is urged to activate a touch panel operation for activating the application, and this serves as a trigger to display a group screen on the touch panel of the second client 2b.

(Plan Creation)

A creation method of a touring plan (itinerary) of each group registered in the database 14 of the server 1 will be explained.

In response to an operation at the first client 2a, based on communication with the first client 2a, the server control device 10 determines presence/absence of a plan registered in the database 14 in association with the user ID of the first user and a group ID of a group designated by the operation (presence/absence of a plan ID (group action ID) associated with the group ID). The plan means the plan of the group created by the first user or the group in which the first user participates. In response to a determination result that the corresponding plan is not present, a "primary planning screen" is displayed on the touch panel of the first client 2a. In response to a determination result that the corresponding plan is present, a "secondary planning screen (see FIG. 14)" is displayed on the touch panel of the first client 2a.

Figure 9:
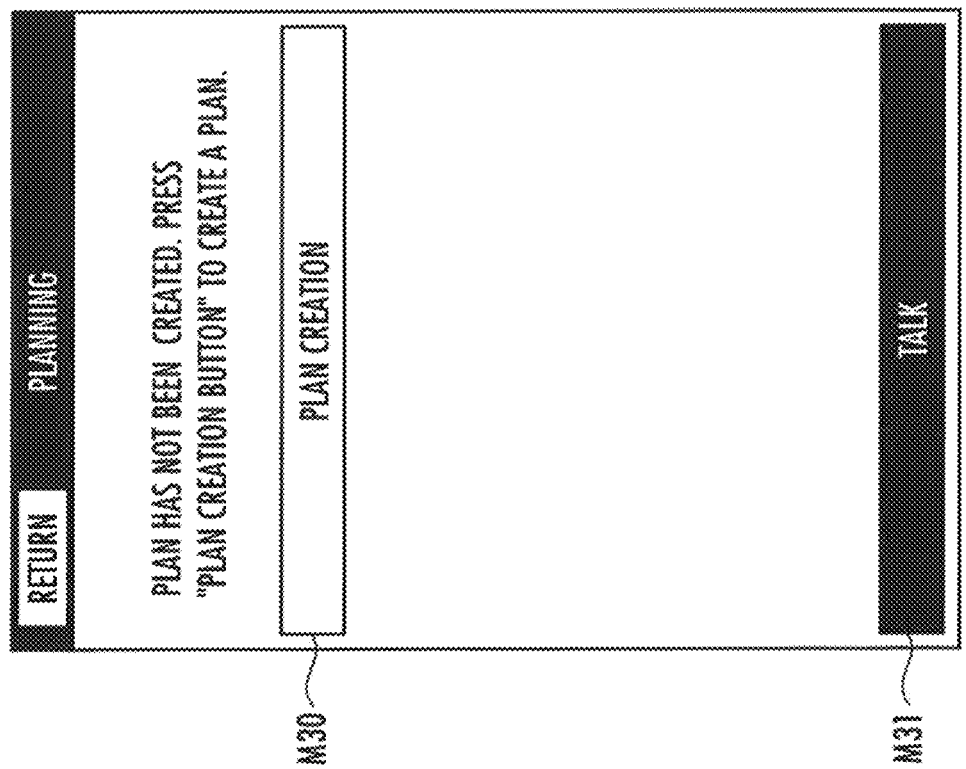
FIG. 9 is an explanatory drawing about a developed mode of a planning screen in a state with no plan.

For example as shown in FIG. 9, the primary planning screen includes a message which urges plan creation, a button M30 for starting plan creation, and a talk button M31. When the plan creation button M30 is operated, the display screen of the touch panel makes a transition to a plan creation screen (FIG. 3/STEP 208). When the talk button M31 is designated, the display screen of the touch panel makes a transition to a talk screen (see FIG. 16).

Figure 10:
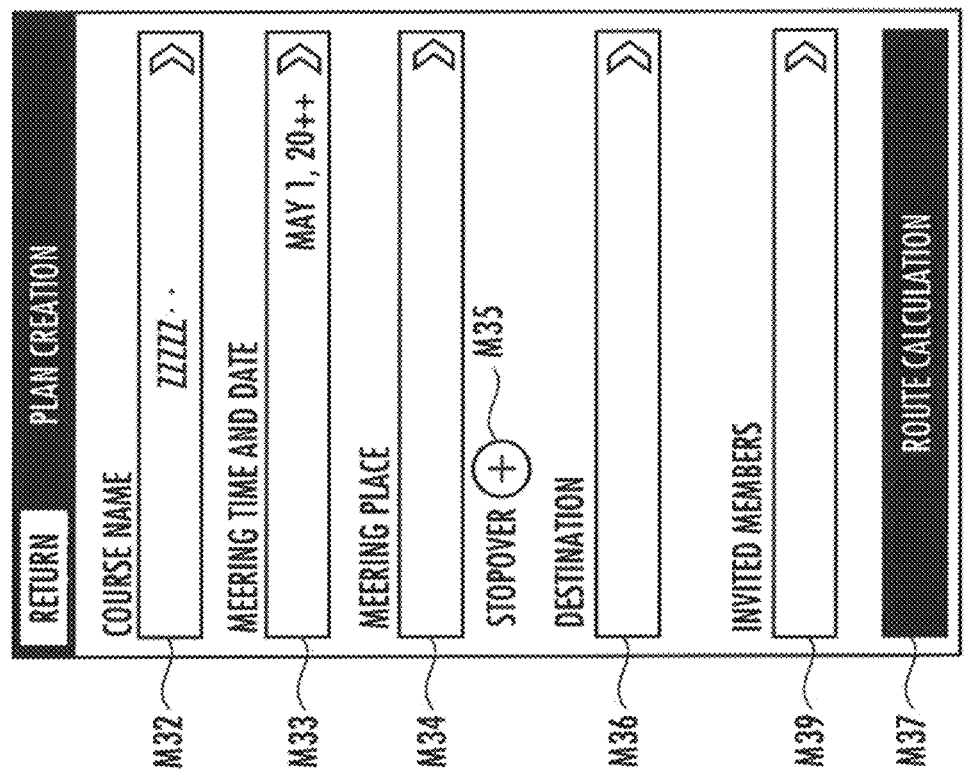
FIG. 10 is an explanatory drawing about a plan creation screen.

The plan creation screen constitutes an input/output interface for creating or setting a plan or an itinerary determined by meeting time and date, a departure place, a stopover(s), a destination, and a route from the departure place to the destination through the stopover(s). For example as shown in FIG. 10, the plan creation screen includes a course name button M32, a meeting time/date button M33, a meeting place button M34 (departure place button), a stopover button M35, a destination button M36, a route calculation button M37, and a member invitation button M39. When the stopover button M35 is operated, for example, a predetermined number (for example, "5") of stopover entry fields M351 to M355 are displayed on the touch panel as shown in FIG. 11.

A course name is input or edited through operations of the course name button M32 and the character keys displayed on the touch panel. Departure time and date is input or edited through operations of the meeting time/date button M33 and the character keys displayed on the touch panel (or calendar and clock). When the entry fields M34, M351 to M355, and M36 corresponding to a meeting place, a stopover(s), and a destination are operated, the display screen of the touch panel makes a transition to a locational-point setting screen.

The name(s) of a member(s) invited to the plan is input or edited through operations of the member invitation button M39 and the character keys displayed on the touch panel.

As shown in FIG. 12, the location-point setting screen includes a "CURRENT LOCATION" button M381, a "HOME" button M382, a "KEYWORD SEARCH" button M383, a "SET ECT FROM FAVORITES" button M384, a "SET ECT FROM HISTORY" button M385, and a "SET ECT FROM CONTACT ADDRESSES" button M386. In response to an operation of the current location button M381, the current location (specified by a latitude/altitude coordinate value and, in accordance with needs an altitude) of the first client 2a measured by a GPS positioning function thereof is set as, for example, a meeting place. In response to selection of the home button M382, the location (specified by a latitude/longitude coordinate value and, in accordance with needs, an altitude) of a home which is registered in the storage device 24 of the first client 2a in advance is set as, for example, a meeting place. In response to designation of the keyword search button M383, in response to a further operation after a keyword is input through operations of the character keys on the touch panel, a location point specified by a location name including the keyword is set as, for example, a stopover. In response to designation of each of the selection buttons M384 to M386, a list of, for example, location names stored in the storage device 24 of the first client 2a in advance is displayed, and a locational point specified by, for example, one locational name selected from the list is set as, for example, a destination. As a result, the departure place, the stopover(s), and the destination are recognized by the client control device 20.

After the locational point is set, the display screen of the touch panel makes a transition to a plan creation screen (see FIG. 10 and FIG. 11). Each of the meeting place, the stopover(s), and the destination may be input through operations of the character keys on the touch panel.

At the first client 2a, when the route calculation button M37 is designated, the client control device 20 requests a route calculation to the server 1 by network communication (FIG. 3/STEP 210). The request includes the meeting time and date (departure time and date), the meeting place (departure location), the stopover(s), and the destination input to the first client 2a in the above described manner.

In response to this request, after the server control device 10 recognizes the meeting time and date, the meeting place, the stopover(s), and the destination included in the request, the server control device 10 calculates or searches for a route from the meeting place to the destination through the stopover(s) (FIG. 3/STEP 108). In the route calculation, in addition to road map information stored in the database 14 of the server 1, road traffic information acquired from an external road-traffic-information center, and weather information acquired from a weather information center is used. The server control device 10 transmits a route calculation result to the first client 2a. At the first client 2a, the client control device 20 recognizes the route calculation result and causes the display screen of the touch panel to make a transition to a route calculation result screen (FIG. 3/STEP 212).

Figure 13:
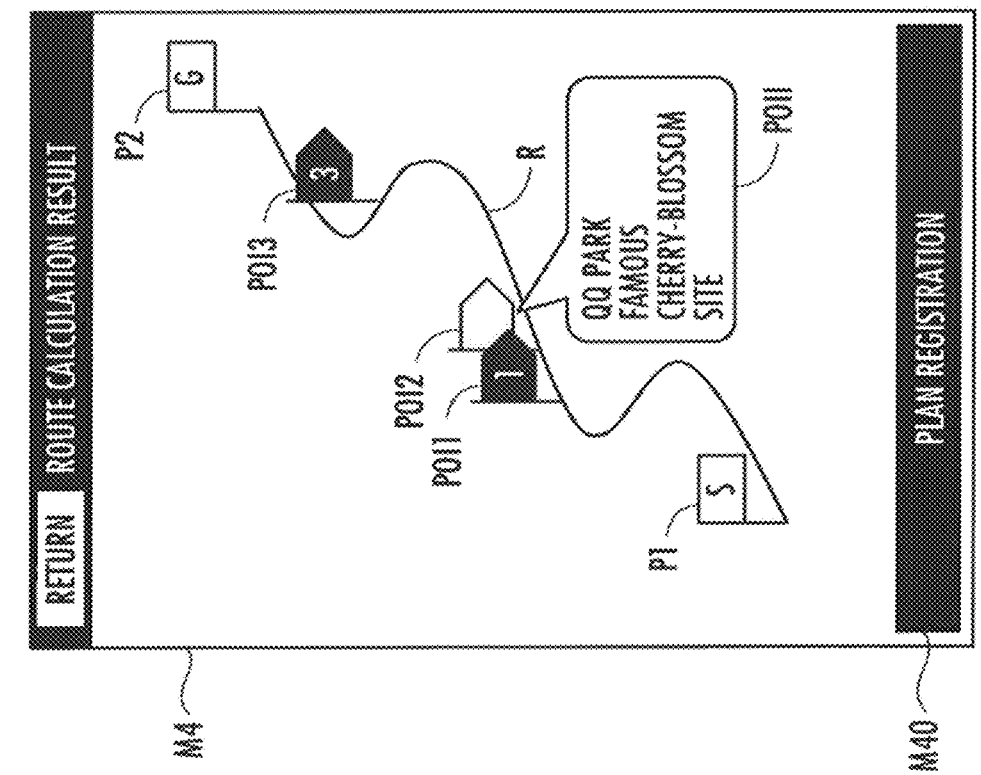
FIG. 13 is an explanatory drawing about a route calculation result screen.

As shown in FIG. 13, in the route calculation result screen, a departure-place icon P1 representing the departure place (meeting place), a destination icon P2 representing the destination, stopover icons POI1 to POI3 representing the stopovers, and a calculated route R are disposed at the corresponding parts of a map M4. At the first client 2a, the client control device 20 differentiates the design (means the colors, shapes, or patterns of the icons and combinations thereof) or display mode (including the distinguishment between still images and moving images such as the presence/absence of blinking) of the departure-place icon P1 and the destination icon P2 and the design or display mode of the stopover icons POIk (k=1, 2, . . . , n: an arbitrary number can be set as "n").

At the first client 2a, the client control device 20 may search for the attributes (for example, characteristics of roads (sharp curves, steep slopes, poor visibility, accident-prone, etc.) facility types (scenic sites, parks, restaurants, commercial facilities, accommodation facilities, etc.)) of the stopovers represented by the stopover icons POIk from the map information saved in the storage device based on latitude/longitude and differentiate the display modes of the stopover icons POIk depending on the attributes.

At the first client 2a, if any of the departure-place icon P1, the destination icon P2, and the stopover icons POIk is operated, the information (for example, latitude/altitude, name, or attributes) about the locational point represented by the designated icon may be shown by text on the touch panel. For example, as shown in FIG. 13, in response to the fact that the stopover icon POI2 is designated, a pop-up image POII showing, by text, the name of a facility (QQ park) present at the stopover and the attribute (famous cherry-blossom site) is displayed on the touch panel.

The route calculation result screen includes a plan registration button M40 (see FIG. 13), and this plan (including the meeting time and date, the departure time and date, and the route R as a calculation result) is accepted by the first user operating the button M40 (FIG. 3/STEP 214).

In response to this, based on communication with the first client 2a, the server control device 10 recognizes the plan, then, associates a plan ID (group action ID) allocated to the plan with the group ID of the selected group, and registers them in the database 14 (FIG. 3/STEP 110). Based on communication with the server 1, the client control device 20 causes the display screen of the touch panel to make a transition to a secondary planning screen (FIG. 3/STEP 216).

Figure 14:
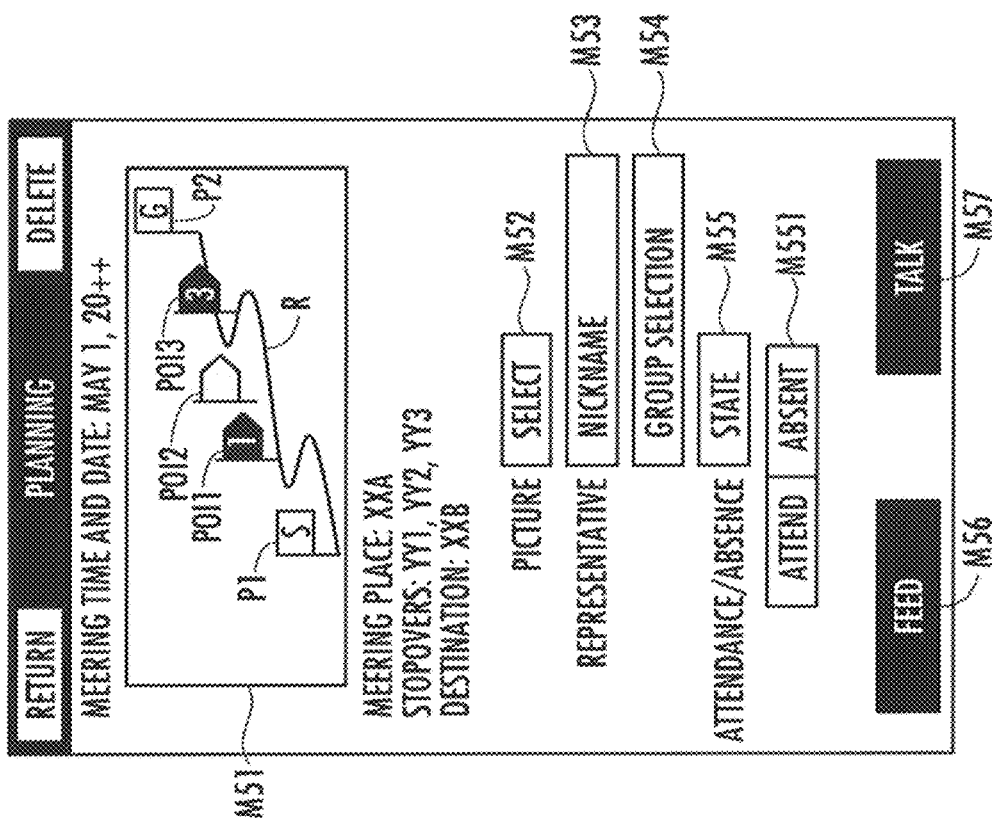
FIG. 14 is an explanatory drawing about a planning screen in a state with a plan.

For example as shown in FIG. 14, the secondary planning screen includes the meeting time and date, the meeting place, the names of the stopovers and the destination, and a window M51 including the route R and the icons P1, P2, and POIk. The secondary planning screen includes a picture selection button M52, a nickname field M53 of a representative, a group selection button M54, a state field M55, attendance/absence buttons M551, a feed button M56, and a talk button M57.

When the picture selection button M52 is operated, a plurality of images saved in the storage device 24 (image folder) of the computer constituting the first client 2a are displayed on the touch panel, and, in response to a further selection, one image is selected from among the plurality of images. In the nickname field M53 of the representative, a nickname of a group creator is displayed by default, but can be edited in accordance with operations of the character keys. The group selection button M54 displays the name of the selected group. The state field M55 displays the distinguishment of attendance (participation) and absence (non-participation) to the plan in accordance with selection of either one of the attendance/absence buttons M551. In response to an operation of the feed button M56, the display screen of the touch panel makes a transition to a feed screen (see FIG. 15). In response to an operation of the talk button M57, the display screen of the touch panel makes a transition to a talk screen (see FIG. 16).

In the route calculation result screen (see FIG. 13), pressing of the plan registration button M40 serves as a trigger to transmit the user ID of the member input or edited in the plan creation screen (see FIG. 10) to the server 1.

The server control device 10, which has received the user ID, records the state of invitation of the second user to the plan, which is distinguished by the user ID, into the database 14 of the server 1 and transmits a plan invitation message to the second client 2b, which is used by the invited second user.

At the second client 2b, which has received the plan invitation message, a first condition registration process is executed (FIG. 3/STEP 410). The first condition registration process will be described later.

(Plan Sharing)

A method of sharing information about a touring plan (itinerary) among a plurality of users or members having the same group as a belonging target registered in the database 14.

In response to an operation such as an operation of the feed button M26 in the group screen (see FIG. 7) or an operation of the feed button M56 in the planning screen (see FIG. 14), based on communication with the server 1, the client control device 20 displays a feed screen on the touch panel of the second client 2b. For example as shown in FIG. 15, the feed screen includes a "CLOSE" button M61, a plan adding button M62, a plurality of plan buttons M63, and a group button M64.

When the close button M61 is operated, the display screen of the touch panel makes a transition to a top screen. When the plan adding button M62 is operated, the display screen of the touch panel makes a transition to a screen for adding a plan(s) such as a plan creation screen (see FIG. 10). The plan button M63 shows the name of the group in/to which the user of the second client 2b is participating or invited, the name of a plan associated with the group, departure time and date (meeting time and date), the names of a departure place and a destination, and a map showing an outline of a plan route. When the group button M64 is operated, the display screen of the touch panel makes a transition to a group screen (see FIG. 7).

At the second client 2b, when the single plan button M63 is operated, the client control device 20 recognizes the designated plan. In response to this, based on communication with the second client 2b, the server control device 10 recognizes the group ID of the group corresponding to the plan ID of the designated plan and then searches the database 14 for the designated plan based on the group ID.

At the second client 2b, based on communication with the server 1, the client control device 20 recognizes the designated plan as a search result and then displays, on the touch panel, a screen showing the designated plan. This screen includes, for example, meeting time and date, the departure-place icon P1, the destination icon P2, the stopover icons POIk, and the route R (see FIG. 13 or FIG. 14).

At the second client 2b, the client control device 20 may differentiate the display modes of the stopover icons POIk depending on the attributes of the stopovers represented by the stopover icons POIk (see FIG. 13). At the second client 2b, when any of the departure-place icon P1, the destination icon P2, and the stopover icons POIk is operated, the information about the locational point represented by the designated icon may be displayed by text on the touch panel (see FIG. 13).

(Position/Image Information Sharing)

Figure 4:
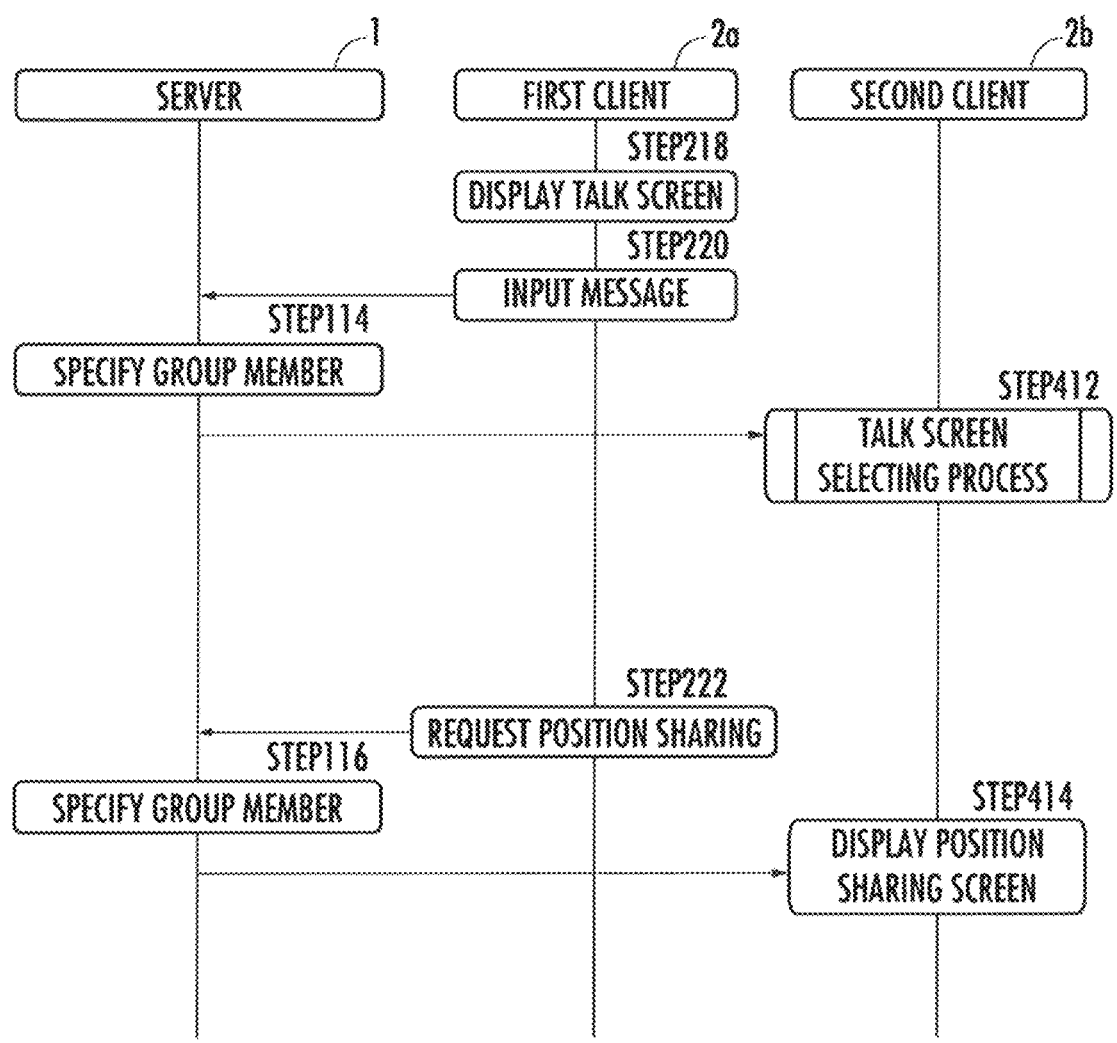
FIG. 4 is an explanatory drawing about a position-information sharing function by the information sharing system.

At the first client 2a, in response to an operation such as an operation of the talk button M31 in the primary planning screen (see FIG. 9) or an operation of the talk button M57 in the secondary planning screen, based on communication with the server 1, the client control device 20 causes the display screen of the touch panel to make a transition to a talk screen (FIG. 4/STEP 218). The talk screen is a screen for communication among group members participating in the same group.

Figure 16:
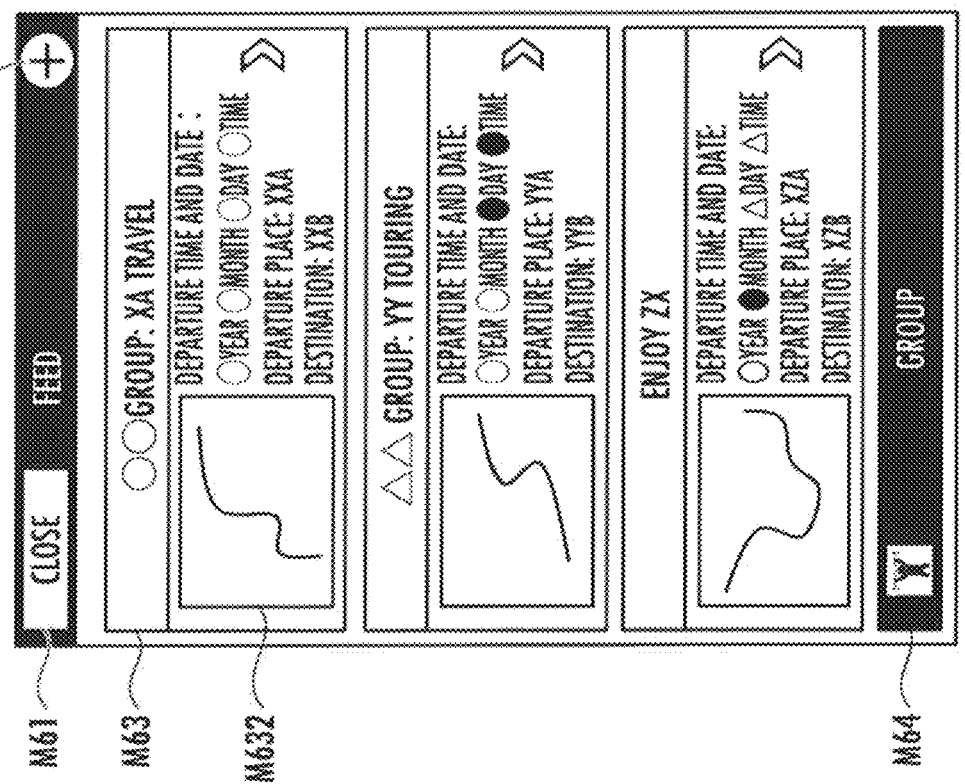
FIG. 16 is an explanatory drawing about a normal talk screen.

For example as shown in FIG. 16, the talk screen includes the name of the group the first user is participating in, pop-up images M72 showing icons M71 of the users who have sent the messages among the users (members) participating in the group and the messages, an image sharing button M73, a position sharing button M74, and character keys M75.

When a message is input through operations of the character keys M75 in the talk screen and when an operation of sending the message is carried out (FIG. 4/STEP 220), based on communication with the first client 2a, the server control device 10 recognizes the group ID of the group with which the message and the first user intend to contact. The server control device 10 specifies the second client 2b of the second user, which is distinguished by the user ID associated with the group ID (FIG. 4/STEP 114).

Based on communication with the server 1, the client control device 20 of the second client 2b carries out a later-described talk-screen selecting process (FIG. 4/STEP 412).

At the first client 2a, when the position sharing button M74 is operated, the client control device 20 detects this operation as an operation of a first designation mode and transmits a position sharing request, which is including the current position of the first client 2a and the group ID, to the server 1 (FIG. 4/STEP 222). The current position (latitude/longitude) of the first client 2a may be measured by a positioning function using GPS or may be set through operations of the touch panel (position designating operation of displayed map, location name inputting operation by character keys, etc.).

The server control device 10 searches the database 14 by using the group ID included in the request, thereby specifying the second client 2b of the second user distinguished by the user ID registered in the database 14 in association with the group ID (FIG. 4/STEP 116). Based on communication with the second client 2b, the server control device 10 causes the client control device 20 to recognize the position of the first user included in the request and display a position sharing screen on the touch panel (FIG. 4/STEP 414).

In the position sharing screen displayed on the touch panel of the second client 2b, for example as shown in FIG. 17, an icon M81 representing the first user, which is a transmission source of the position sharing request, is disposed and shown at a central position of a map M8. The position of the icon M81 in the map M8 may be changed to be included in a designated range occupying a central part of the map M8.

In response to operations of the character keys M75 displayed on the touch panel at the first client 2a, position sharing is requested after a message is input (see FIG. 4/STEP 222), and, based on communication with the first client 2a, the server control device 10 recognizes the message and then registers that in the database 14. This message is a message representing, for example, a current situation of the first user (taking a break at ●●, trouble occurred, running at low speed, etc.). At the second client 2b, if the client control device 20 detects display of the icon M81 representing the first user, based on communication with the server 1, the message sent from the first client 2a is recognized, and the message is then displayed on the touch panel.

At the first client 2a, when the image sharing button M73 is operated, as well as position sharing, an image designated by the first user is displayed on the touch panel of the second client 2b so that it is shared by the second user who is participating in the same group.

(First Condition Registration Process)

As described above, in the plan creation process by the first user of the first client 2a, if information for specifying the second user such as the name or ID of the second user is input in the "invited member" field of the plan creation screen (see FIG. 3/STEP 208 and FIG. 10), pressing of the plan registration button M40 in the route calculation result screen (see FIG. 13) triggers the server control device 10 to transmit a plan invitation message about the plan to the second client 2b (see FIG. 3/STEP 214 and FIG. 3/STEP 410).

Hereinafter, with reference to FIG. 21 to FIG. 22, the first condition registration process, which is carried out in the second client 2b when the plan invitation message is received, will be explained.

Figure 21:
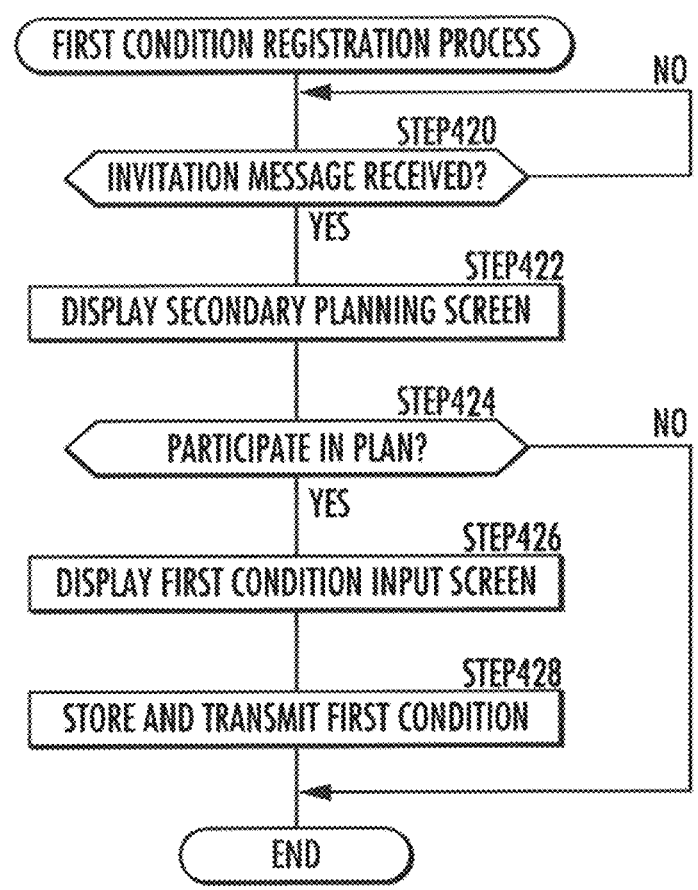
FIG. 21 is a flow chart of a first condition registration process.
Figure 22:
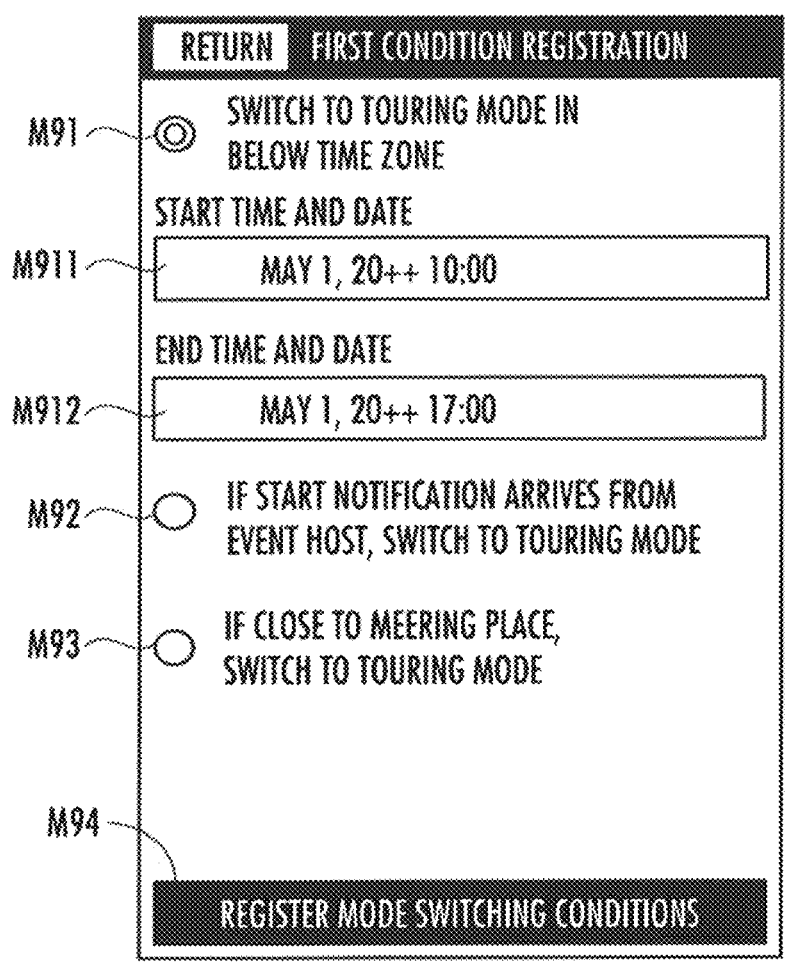
FIG. 22 is an explanatory drawing about a first condition registration screen.

The client control device 20 of the second client 2b determines whether or not the plan invitation message has been received via the communication device 23 (FIG. 21/STEP 420). If the determination result is negative (FIG. 21/STEP 420 . . . NO), the client control device 20 of the second client 2b executes the process of FIG. 21/STEP 420 again.

If the determination result is positive (FIG. 21/STEP 420 . . . YES), the client control device 20 of the second client 2b displays a secondary planning screen (FIG. 14) associated with the plan ID included in the plan invitation message (FIG. 21/STEP 422).

The present explanations include the part that is overlapped with the above described explanations of plan sharing; however, while the former one is the explanations of plan sharing (process until details of the plan, etc. are checked by the members), the present explanations explain a series of flows until actual participation in the plan.

Based on communication with the server 1, the client control device 20 of the second client 2b displays a feed screen on the touch panel of the second client 2b. For example as shown in FIG. 15, the feed screen includes the "CLOSE" button M61, the plan adding button M62, the plurality of plan buttons M63, and the group button M64.

When the close button M61 is operated, the display screen of the touch panel makes a transition to the top screen. When the plan adding button M62 is operated, the display screen of the touch panel makes a transition to a screen for adding a plan such as a plan creation screen (see FIG. 10). The plan button M63 shows the name of the group in/to which the user of the second client 2b is participating or invited, the name of a plan associated with the group, departure time and date (meeting time and date), the names of a departure place and a destination, and a map showing an outline of a plan route. When the group button M64 is operated, the display screen of the touch panel makes a transition to a group screen (see FIG. 7).

At the second client 2b, when the single plan button M63 is operated, the client control device 20 recognizes the designated plan.

In response to this, based on communication with the second client 2b, the server control device 10 recognizes the group ID of the group corresponding to the plan ID of the designated plan and then searches the database 14 for the designated plan based on the group ID.

At the second client 2b, based on communication with the server 1, the client control device 20 recognizes the designated plan as a search result and then displays a secondary planning screen showing the designated plan on the touch panel. This screen includes, for example, meeting time and date, a departure-place icon P1, a destination icon P2, stopover icons POIk, and a route R (see FIG. 14).

At the second client 2b, the client control device 20 may differentiate the display modes of the stopover icons POIk depending on the differences in the attributes of the stopovers represented by the stopover icons POIk (see FIG. 13). At the second client 2b, if any of the departure-place icon P1, the destination icon P2, and the stopover icons POIk is operated, the information about the locational point represented by the designated icon may be displayed by text on the touch panel (see FIG. 13).

Returning to the explanations of FIG. 21, in response to an operation of the second user such as detection of pressing of the attendance/absence button M551 in the secondary planning screen, the client control device 20 of the second client 2b determines whether or not the second user is to attend (participate) the plan (FIG. 21/STEP 424).

If the determination result is positive (FIG. 21/STEP 424 . . . YES), the client control device 20 of the second client 2b causes an image display device of the output device 22 to display a first condition input screen (see FIG. 22) for inputting conditions for switching the mode of the application to a second mode (FIG. 21/STEP 426).

In combination with those described above, the client control device 20 of the second client 2b transmits the plan ID of this plan and the user ID of the second user to the server 1, thereby storing the plan ID and the user ID, which is registered to participate in the plan, in association with each other in the database 14 of the server 1.

The first condition input screen includes a time-zone-condition setting button M91 for setting switching of the mode of the application to a second mode depending on time zones, a notification-reception-condition setting button M92 for setting switching of the mode of the application to the second mode depending on reception of an event opening notification from an event host, a position-condition setting button M93 for setting switching of the mode of the application to the second mode depending on the position of the second user, and a first-condition registration button M94 for registering a first condition.

The first condition input screen further includes a start-time/date designating button M911 and an end-time/date designating button M912 for designating the time zone of the time-zone-condition setting button M91. The second user can designate the start time and date and the end time and date by operating the character keys (or calendar and clock) displayed on the touch panel.

When pressing of the first condition registration button M94 is detected, the client control device 20 of the second client 2b stores the input first condition in the storage device 24 in association with the plan ID, transmits them to the server 1, and stores the first condition in the database 14 in association with the user ID of the second user and the plan ID (FIG. 21/STEP 428).

After the process of FIG. 21/STEP 428 or if the determination result of FIG. 21/STEP 424 is negative (FIG. 21/STEP 424 . . . NO), the client control device 20 of the second client 2b terminates the first condition registration process.

(Talk-Screen Selection Process)

Next, a selection process of the talk screen will be explained with reference to FIG. 23 to FIG. 24. In the present explanations, the explanations will be given by taking, as an example, a case in which transmission of a message (new information) from the first user to the second client 2b of the second user who has registered the first condition for the plan (FIG. 4/STEP 220) triggers a transition to a talk screen.

Figure 23:
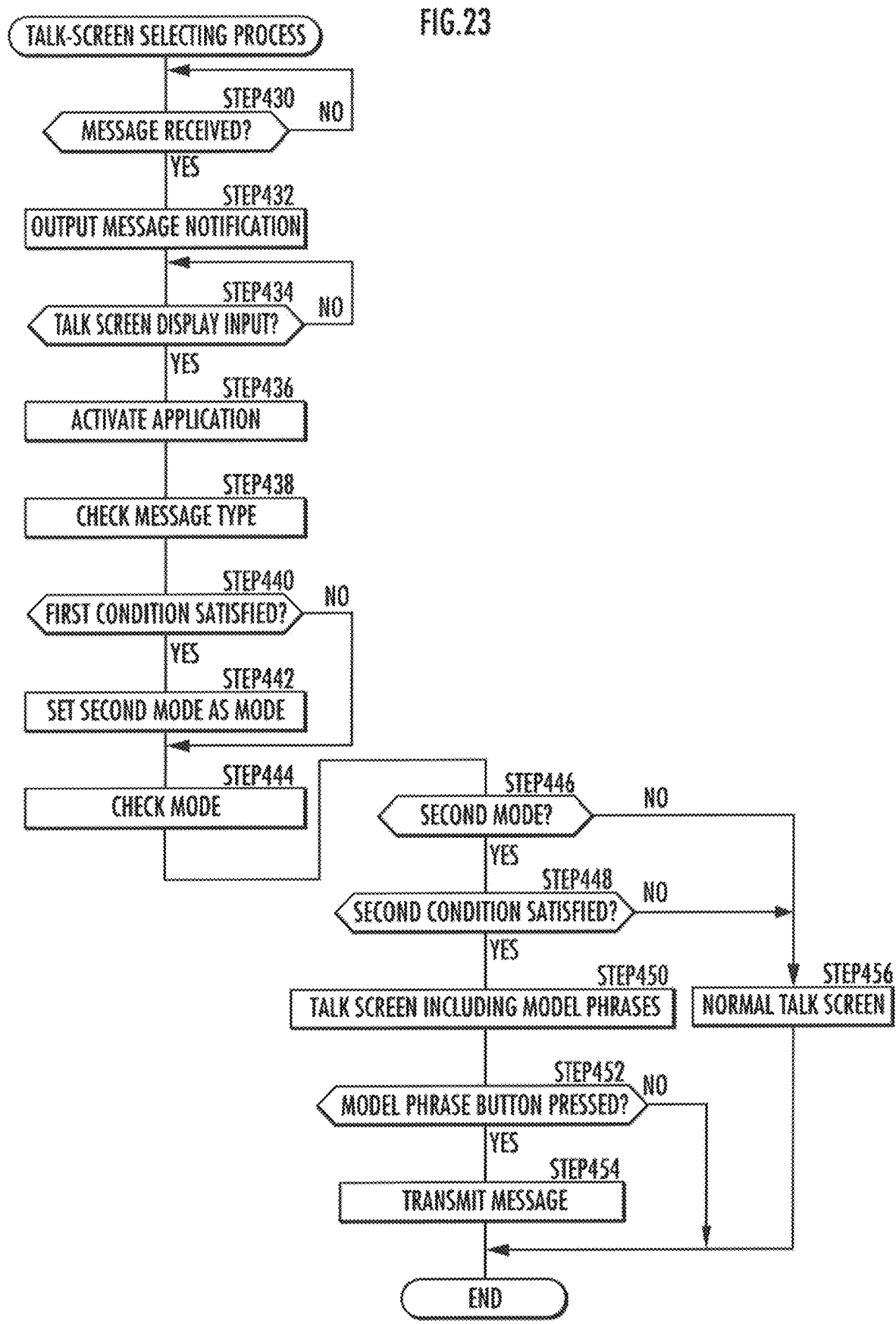
FIG. 23 is a flow chart of a talk-screen selecting process.
Figure 24:
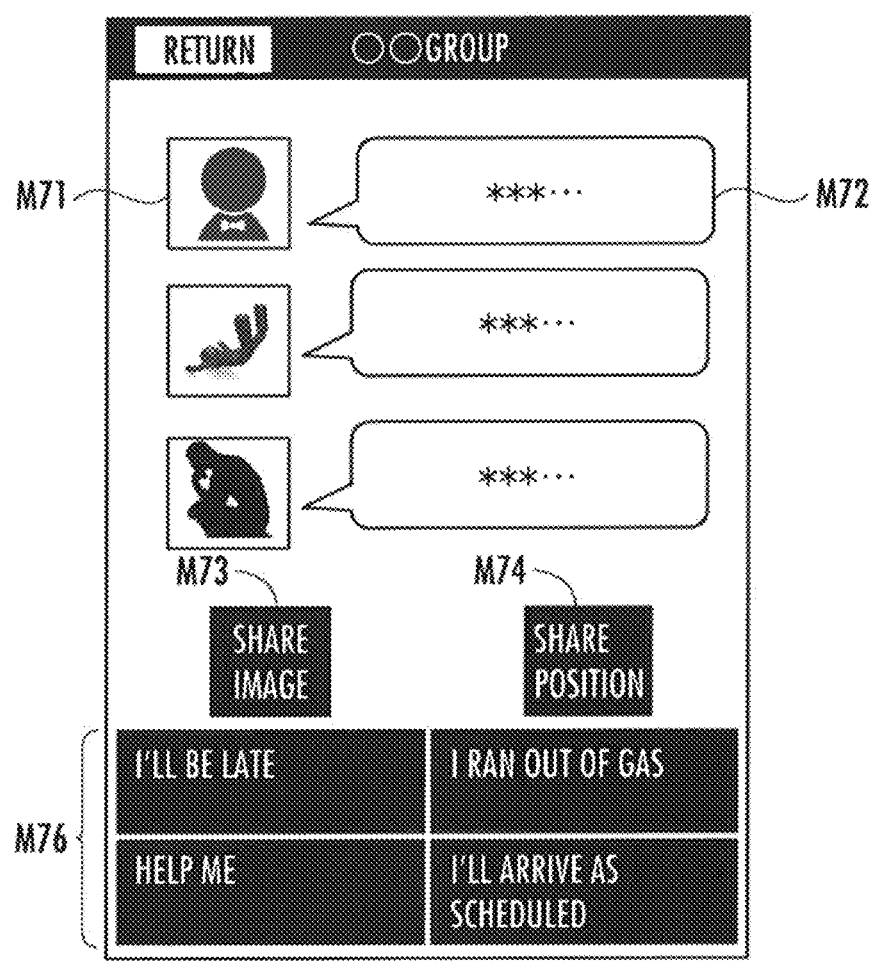
FIG. 24 is an explanatory drawing about a talk screen including model phrases.

The client control device 20 of the second client 2b determines whether or not a message (new information) has been received (FIG. 23/STEP 430). If the determination result is negative (FIG. 23/STEP 430 . . . NO), the client control device 20 of the second client 2b re-executes the process of FIG. 23/STEP 430.

If the determination result is positive (FIG. 23/STEP 430 . . . YES), the client control device 20 of the second client 2b outputs a reception notification of the message to the output device 22 (FIG. 23/STEP 432).

The client control device 20 of the second client 2b determines whether or not there is a talk screen display input such as pressing of a message display button by the second user (FIG. 23/STEP 434). If the determination result is negative (FIG. 23/STEP 434 . . . NO), the second user executes the process of FIG. 23/STEP 434 again.

If the determination result is positive (FIG. 23/STEP 434 . . . YES), the client control device 20 of the second client 2b activates the application (FIG. 23/STEP 436).

As a process of the application, the client control device 20 of the second client 2b acquires the type (text, picture, position information, etc.) of the received message (FIG. 23/STEP 438). In response to the type of the received message, the client control device 20 of the second client 2b appropriately switches a displayed message image.

The client control device 20 of the second client 2b determines whether or not the first condition registered in FIG. 21/STEP 426 to STEP 428 is satisfied (FIG. 23/STEP 440).

For example, if a time-zone condition is registered as the first condition in FIG. 21/STEP 426 to STEP 428, the client control device 20 of the second client 2b determines whether the current time shown by a clock function of the client control device 20 is after the start time and date and before the end time and date stored in the storage device 24 or the database 14, thereby determining whether or not the first condition is satisfied.

For example, if a notification-reception condition is registered as the first condition in FIG. 21/STEP 426 to STEP 428, the client control device 20 of the second client 2b determines whether or not an event opening notification from an event host (for example, the first user) has been received is determined, thereby determining whether or not the first condition is satisfied.

For example, if a position condition is registered as the first condition in FIG. 21/STEP 426 to STEP 428, the client control device 20 of the second client 2b determines whether or not the current position of the second client 2b measured by the self-location measuring function is within a predetermined distance from a designated location such as the meeting place of the plan stored in the storage device 24 or the database 14, thereby determining whether or not the first condition is satisfied.

This first condition may be a condition stored in the storage device 24 of the second client 2b or may be a condition searched in the server 1 based on the user ID of the second user.

The client control device 20 of the second client 2b may determine whether or not the first condition is satisfied by referencing a determination result of satisfaction or non-satisfaction of the first condition of the second user by the server control device 10 of the server 1.

If the determination result is positive (FIG. 23/STEP 440 . . . YES), the client control device 20 of the second client 2b sets the mode of the application to the second mode (FIG. 23/STEP 442).

If the determination result is negative (FIG. 23/STEP 440 . . . NO) or after the process of FIG. 23/STEP 442, the client control device 20 of the second client 2b checks the mode of the application (FIG. 23/STEP 444).

The client control device 20 of the second client 2b determines whether or not the checked mode of the application is the second mode (FIG. 23/STEP 446).

If the determination result is positive (FIG. 23/STEP 446 . . . YES), based on a user ID of the sender (first user) of the message, the client control device 20 of the second client 2b determines whether or not a second condition that the user ID is associated with the plan ID is satisfied (FIG. 23/STEP 448).

If the determination result is positive (FIG. 23/STEP 448 . . . YES), the client control device 20 of the second client 2b displays a talk screen including model phrase buttons M76 (second information) shown in FIG. 24 (FIG. 23/STEP 450).

The model phase buttons M76 include display of model phrases (first information) such as "I'll be late.", "I ran out of gas.", "Help me.", and "I'll arrive as scheduled." related to the plan specified by the plan ID. In response to detection of pressing of the model phrase button M76 (FIG. 23/STEP 452 . . . YES), the client control device 20 of the second client 2*b* transmits a model phrase (first information) included in the model phrase button M76 to the server 1 (FIG. 23/STEP 454).

If the determination result of FIG. 23/STEP 446 or FIG. 23/STEP 448 is negative (FIG. 23/STEP 446 . . . NO or FIG. 23/STEP 448 . . . NO), the client control device 20 of the second client 2*b* displays a talk screen including the character keys shown in FIG. 16 (FIG. 23/STEP 456). In this screen, as described above, the client control device 20 of the second client 2*b* transmits appropriate information to the server 1 in response to, for example, operations of the character keys.

If the determination result of FIG. 23/STEP 452 is negative (FIG. 23/STEP 452 . . . NO), the client control device 20 of the second client 2*b* terminates the talk screen selection process after the process of FIG. 23/STEP 454 or after the process of FIG. 23/STEP 456.

(Correspondence Relation with the Present Invention)

In the first condition registration process and the talk-screen selecting process, the second client 2*b* corresponds to a "client" of the present invention, and the second user corresponds to an "own user" of the present invention.

The model phrase button M76 corresponds to "second information" of the present invention, pressing of the model phrase button M76 corresponds to a "predetermined input mode having a small number of times of input", and the model phrase corresponds to "first information" of the present invention.

The server 1 corresponds to "external equipment" and a "server" of the present invention.

The first client 2*a* corresponds to "another client" of the present invention, the first user corresponds to "another user" of the present invention, and the message sent from the first client 2*a* corresponds to "new information" of the present invention.

(Effects)

According to the server 1 and the client 2 of the present invention and the information sharing system constituted by them, a plan determined by a first member (first user) through the first client 2*a* can be informed to another member (second user) belonging to the same group through the second client 2*b* (see FIG. 3). As a result, after the second user perceives a route of which calculation is requested to the server 1 by the first user, a stopover(s) serving as a basis of the calculation, the attribute of the stopover, and the information related to the stopover, participation or non-participation in the plan created by the first user can be determined.

In response to a request sent from the first member (first user) through the first client 2*a*, the current location of the first member can be informed to the another member (second user) who is belonging to the same group through a map displayed on the second client 2*b* (see FIG. 4 and FIG. 17 to FIG. 20).

Furthermore, since messages can be exchanged among the users belonging to the same group, communication about the plan is carried out (see FIG. 16). As a result, the communication among the plurality of members about the plan determined by the route or the latest situations of the members is facilitated.

According to the client 2 of this configuration, if it is determined that the first condition is satisfied (FIG. 23/STEP 440 . . . YES), the second mode is set as the mode of the application; and, in a case of the second mode, the model phrase buttons M76 (see FIG. 24) including the model phrases are displayed on the image display device instead of the character keys M75 (see FIG. 16). Since the own user can send the first information more easily than the case in which it is determined that the first condition is not satisfied (FIG. 23/STEP 440 . . . NO), sharing of information in the case in which the predetermined conditions are satisfied is facilitated.

According to the client 2 of this configuration, since the first information can be easily sent in the time zone (start time to end time) in which information sharing is expected to be carried out, information sharing is facilitated.

According to the client 2 of this configuration, together with the new information (message) sent from the second client 2, the second information (model phrase buttons M76) for causing the own user to recognize that the first information (model phrase) associated with the input mode can be sent by the predetermined input mode is output. In other words, the additional information (second information) other than the information (new information) to be shared is output together with the information (new information) to be shared; therefore, troublesomeness given to the own user can be reduced or eliminated compared with the case in which they are separately output.

According to the client 2 of this configuration, since the buttons (model phrase buttons M76) including the first information (model phrases) are output (displayed) together with the new information (message), the own user can recognize, together with the new information, that the first information can be sent by selecting the button. As a result, the troublesomeness given to the own user can be reduced or eliminated.

According to the client 2 of this configuration, since the condition set by the own user or another user is used as the first condition, the intention of the own user or the another user is taken into consideration in determination of satisfaction or non-satisfaction of the first condition. As a result, information sharing is facilitated.

According to the client 2 of this configuration, if the user ID of the second user is associated with the plan ID (FIG. 23/STEP 448 . . . YES), the second information (model phrase buttons M76) for causing the own user to recognize that the first information (model phrases) can be sent is output.

In other words, if the probability that the new information sent from the second user is related to group actions is high, the second information for easily sending the first information is output; therefore, the troublesomeness given to the own user can be reduced or eliminated.

Other Embodiments of the Present Invention

In the above described embodiment, the route is calculated by the server control device 10 in the server 1 (see FIG. 3/STEP 108). However, the route may be calculated by the client 2, and the plan including the calculated route may be registered in the database 14 in response to plan acceptance at the client 2 (see FIG. 3/STEP 214 to STEP 110).

In the above described embodiment, the map M8 including the icon M81 representing the first user serving as the transmission source of the position sharing request is displayed on the touch panel of the client 2 of the second user belonging to the same group (see FIG. 17). However, the map M8 further including an icon M82 representing the second user may be displayed on the touch panel. For example, in the position sharing screen, as shown in FIG. 18, the icon M82 representing the user of the first client 2*a* may be displayed at a corresponding position. The scale size of the map M8 may be automatically adjusted by the client control device 20 so as to enable this display.

Figure 19:
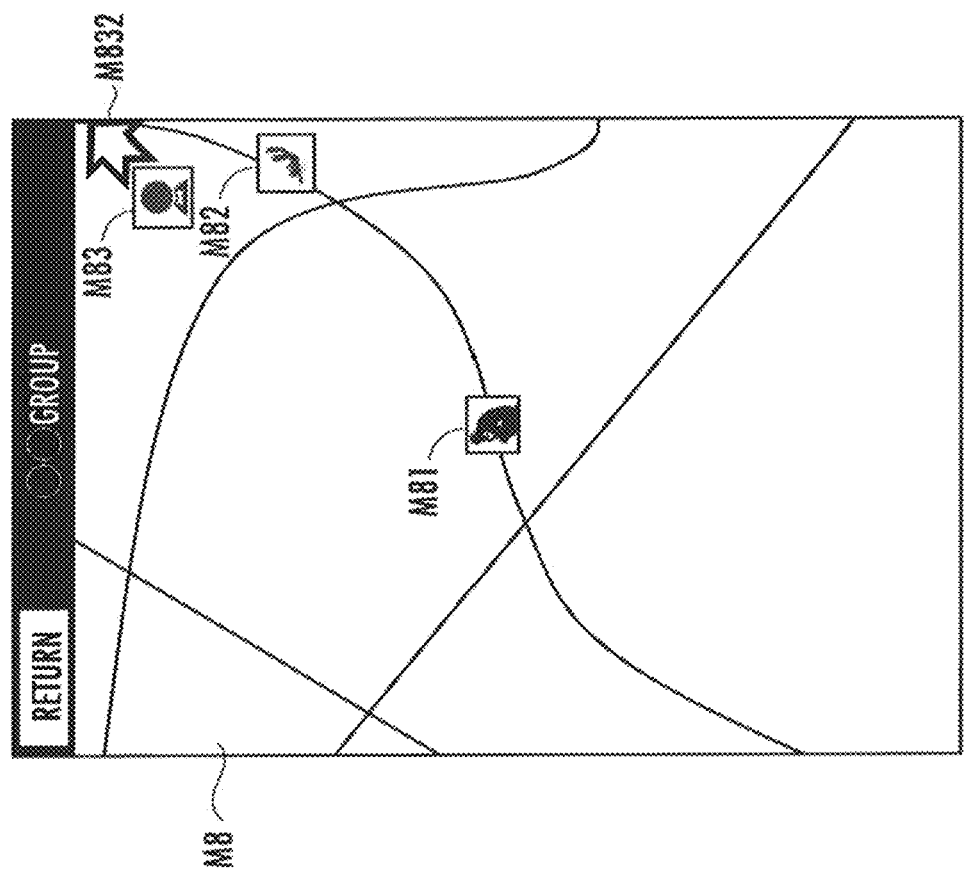
FIG. 19 is an explanatory drawing about a third example of a position sharing screen.

In response to the fact that position sharing has been requested, a map including the icons representing all the other users belonging to the same group in addition to the icon M81 representing the first user may be displayed on the touch panels of the clients 2 of the other users. Specifically, based on communication between the server 1 and the second clients 2b of all the respective second users belonging to the same group as the first user serving as the transmission source of the request, the server control device 10 recognizes the respective positions of the second users. Based on communication between the server 1 and the second client 2b, for example as shown in FIG. 19, the server control device 10 displays, on the touch panel of the second client 2b, a position sharing screen in which the icon M81 representing the first user, the icon M82 representing the second user, and an icon M83 representing a third user are shown on the map M8. In the example shown in FIG. 19, the position of the icon M81 representing the first user is adjusted to be deviated from the center of the map M8. As a result, the scale size of the map M8 is maintained to a predetermined value or more.

Figure 20:
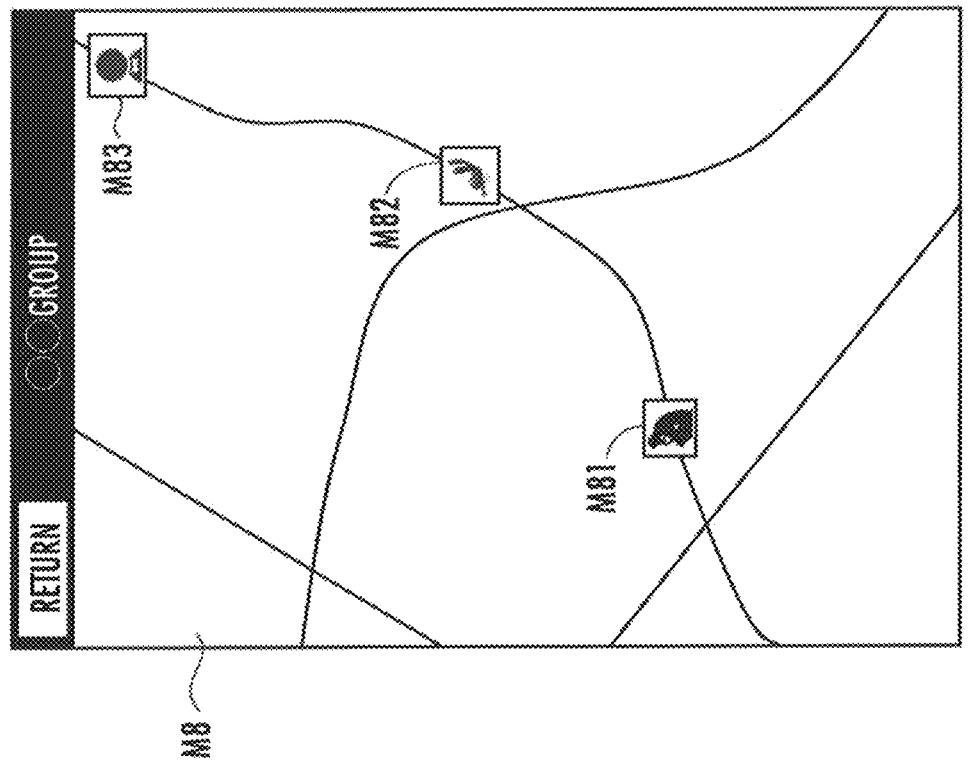
FIG. 20 is an explanatory drawing about a fourth example of a position sharing screen.

From the viewpoint of maintaining the scale size of the map M8 to the predetermined value or more, if it is difficult to display all the icons, which represent the group members, at the corresponding parts of the map M8, for example as shown in FIG. 20, the icon M83 representing the user at a location deviated from the display range of the map M8 and an icon M832 showing the deviation direction may be displayed on the touch panel.

In the first condition registration process of the present embodiment, reception of the plan invitation message by the second client 2b of the second user (FIG. 21/STEP 420 . . . YES) serves as a trigger to carry out the plan first condition registration; however, the plan invitation message is not necessarily required to be received. For example, after a transition is made from the feed screen (FIG. 15) to the secondary planning screen (FIG. 14), the processes of FIG. 21/STEP 424 and thereafter may be executed.

In the talk-screen selecting process of the present embodiment, reception of the message sent from another client (FIG. 23/STEP 430 . . . YES) triggers to carry out talk screen selection. However, the message sent from the another client is not necessarily required to be received, and, for example, after the application is voluntarily activated by the user, the process of FIG. 23/STEP 438 and thereafter may be executed.

In the talk-screen selecting process of the present embodiment, on the condition that the first condition is satisfied (FIG. 23/STEP 440 . . . YES), the mode of the application is set to the second mode (FIG. 23/STEP 442); and, on the condition that the mode of the application is the second mode (FIG. 23/STEP 446 . . . YES), the talk screen including the model phrases is displayed (FIG. 23/STEP 450). However, instead of this, on the condition that the first condition is satisfied, the talk screen including the model phrases may be displayed.

In the talk-screen selecting process of the present embodiment, satisfaction or non-satisfaction of the first condition registered by the use is determined (FIG. 23/STEP 440). However, instead of this, for example, based on the condition (start time, end time) set in the plan creation screen by a member (for example, the first user) such as an event host who is other than the user and participating in the plan, satisfaction or non-satisfaction of the first condition may be determined.

In the talk-screen selecting process of the present embodiment, whether the user is in a particular state or not is determined by determining satisfaction or non-satisfaction of the first condition registered by the user (FIG. 23/STEP 440). However, instead of this, for example, based on disaster information received from outside, the position information of the user (client 2) measured by the positioning function of the client 2, and the elapsed time from a disaster calculated from the disaster information and the current time measured by a time function of the client 2, for example whether or not the first condition set in advance by a seller of the client is satisfied may be determined.

In the talk-screen selecting process of the present embodiment, as the predetermined input mode having the small number of times of input with respect to the input device, a mode of pressing the model phrase button M76 including the model phrase related to the plan is employed. However, in addition to this or instead of this, for example, an input mode having a small information quantity to be input such as a predetermined sound message associated with a model phrase may be employed.

In the present embodiment, the client control device 20 of the client 2 determines whether or not the first condition is satisfied. However, instead of this, based on the first condition stored in the database 14, the server control device 10 of the server 1 may determine whether or not the first condition is satisfied for each of the members participating in the plan.

In this case, if the server control device 10 of the server 1 determines that the first condition of one member is satisfied, by a predetermined input mode having a smaller number of times of input or a smaller information quantity to be input with respect to the input device 21 provided at the client 2 used by the member than those of the case in which the member is determined that the first condition is not satisfied, an order for causing the input device 21 to function as an input interface for sending predetermined first information associated with the predetermined input mode may be transmitted to the client 2 used by the member.

In the server 1, the server control device 10 is preferred to be configured so as to store the condition for starting the plan, which is received from the client 2 of the member having the user ID associated with the plan ID, in the database 14 as a first condition.

In the server 1 of this configuration, the server control device 10 is preferred to be configured so as to transmit an image (see FIG. 22) for causing the user to designate the condition for starting the plan to the client 2 when the registration of participation in the plan by the user of the client 2 is received.

REFERENCE SIGNS LIST

1 . . . server, 2 . . . client, 10 . . . server control device, 14 . . . database (server storage device), 20 . . . client control device, 21 . . . input device, 22 . . . output device, 24 . . . storage device.

What is claimed is:

1. A client comprising:
an input device that detects an input mode using a display of character keys and an input mode using a display of model phrase buttons of a user;
a communication device that carries out communication;
a clock function that recognizes a current time; and
a client control device configured to
  determine whether or not a first condition set in advance is satisfied and,
  if the first condition is determined to be satisfied, cause the input device to function as an input graphical user interface for sending predetermined first information, which is associated with the input mode using the display of model phrase buttons, via the communication device by the input mode using the display of model phrase buttons, wherein the first condition is a condition that the current time shown by the clock function is included in a time zone set in advance;

an output device that outputs information, the output device comprises an image display device that displays an image;

wherein if the client control device recognizes, by communicating with external equipment via the communication device, new information sent from another client and if the first condition is determined to be satisfied, the client control device is configured to cause the output device to output second information together with the new information, the second information including the first information for causing the own user to recognize that the first information associated with the input mode, the first information being model phrases and the second information being model phrase buttons.

2. The client according to claim 1, further having a clock function that recognizes current time; wherein the first condition is a condition that the current time shown by the clock function is included in a time zone set in advance.

3. The client according to claim 1, further comprising a storage device that stores information; wherein the client control device is configured so as to store, in the storage device, a condition set by the own user or another user as the first condition.

4. A server having a communication function with each of a plurality of clients serving as mobile stations, the server comprising:

a database which associates and stores a group action ID of a group action and a user ID of each of members serving as users registered to participate in the group action, and associates and stores a first condition which includes a condition for the members to start the group action in association with the user ID;

a clock function that recognizes a current time; and a server control device configured to determine whether or not the first condition is satisfied for each of the members based on the first condition stored in the database, and, if the first condition is determined to be satisfied for one of the members, transmit via the network, to the client used by the member, an order for causing an input device to function as an input graphical user interface for sending predetermined first information associated with an input mode using a display of character keys and an input mode using a display of model phrase buttons of a user, which is provided at the client used by the member, than a case in which the server control device determines that the first condition is not satisfied for the member, wherein the first condition is a condition that the current time shown by the clock function is included in a time zone set in advance;

wherein the client comprises a communication device and an output device which outputs information, the output device including an image display device that displays an image; and, if the client control device recognizes, by communicating with the server via the communication device, that a second condition is satisfied in addition to the first condition, the second condition being that a user ID of another user serving as a user of another client is associated with the group action ID in a case in which new information sent from the another client is recognized, the client control device is configured to cause the output device to output second information together with the new information, the second information including the first information for causing the own user to recognize that the first information associated with the input mode, the first information being model phrases and the second information being model phrase buttons.

5. The server according to claim 4, wherein the server control device is configured so as to store, as the first condition in the database, a condition for starting the group action received from the client of the member having the user ID associated with the group action ID.

6. The server according to claim 5, wherein the server control device is configured so as to transmit information for causing the user to designate the condition for starting the group action to the client when receiving registration of participation in the group action by the user of the client.

7. An information sharing system comprising:

the server according to claim 4 and the client serving as the mobile station according to claim 4.

8. An information sharing system comprising the client of claim 1 and a server that communicates with the client; wherein the server comprises a database which associates and stores a group action ID of a group action and a user ID of each of members serving as users registered to participate in the group action, and stores the first condition which further includes a condition for the members to start the group action in association with the user ID; wherein the client control device is configured to, transmit a user ID of the own user to the server via the communication device, and receive from the server a condition for the own user to start the group action regarding the group action having a group action ID associated with the user ID, and determine whether or not the condition for starting the group action is satisfied as determination of satisfaction or non-satisfaction of the first condition.

9. The information sharing system according to claim 8, wherein the client comprises an output device which outputs information; and, if the client control device recognizes, by communicating with the server via the communication device, that a second condition is satisfied in addition to the first condition, the second condition being that a user ID of another user serving as a user of another client is associated with the group action ID in a case in which new information sent from the another client is recognized, the client control device is configured to cause the output device to output, together with the new information, second information for causing the own user to recognize that the first information associated with the input mode can be sent by the predetermined input mode.

10. The information sharing system according to claim 8, wherein the server comprises a server control device configured so as to store the first condition in the database, the first condition further including a condition for starting the group action received from a client of a member having a user ID associated with the group action ID.

11. The information sharing system according to claim 10, wherein the server control device is configured so as to transmit information for the user to designate the condition for starting the group action to the client when receiving registration of participation in the group action by the user of the client.

* * * * *